United States Patent
Imamura

(10) Patent No.: US 7,233,448 B2
(45) Date of Patent: Jun. 19, 2007

(54) ZOOM OPTICAL SYSTEM, AND ELECTRONICS INCORPORATING THE SAME

(75) Inventor: Ayami Imamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 39 days.

(21) Appl. No.: 11/175,029

(22) Filed: Jul. 6, 2005

(65) Prior Publication Data

US 2006/0072211 A1 Apr. 6, 2006

(30) Foreign Application Priority Data

Jul. 7, 2004 (JP) ............................. 2004-200272
Jul. 7, 2004 (JP) ............................. 2004-200273
Jul. 7, 2004 (JP) ............................. 2004-200274

(51) Int. Cl.
  *G02B 15/14* (2006.01)
(52) U.S. Cl. ..................... 359/686; 359/680
(58) Field of Classification Search ........ 359/680–683, 359/686, 676
See application file for complete search history.

(56) References Cited

U.S. PATENT DOCUMENTS 6,985,302 B2 * 1/2006 Nishida ...................... 359/683
2005/0128601 A1 * 6/2005 Minakata ..................... 359/680

FOREIGN PATENT DOCUMENTS

JP     10-48524       2/1998
JP     2003-177315    6/2003

* cited by examiner

*Primary Examiner*—Ricky Mack
*Assistant Examiner*—M. Hasan
(74) *Attorney, Agent, or Firm*—Pillsbury Winthrop Shaw Pittman LLP

(57) ABSTRACT

The invention relates to a zoom optical system that can offer an effective tradeoff between size reductions and cost reductions and electronic equipment incorporating it. The zoom optical system comprises, in order from its object side, a first lens group G1 having negative refracting power, a second lens group G2 having positive refracting power, a third lens group G3 having negative refracting power and a fourth lens group G4 having positive refracting power. The second lens group G2 consists of one positive lens. The positive lens satisfies a condition regarding the temperature coefficient of refractive index.

7 Claims, 22 Drawing Sheets

ZOOM OPTICAL SYSTEM, AND ELECTRONICS INCORPORATING THE SAME

This application claims benefit of Japanese Application Nos. 2004-200272, 2004-200273 and 2004-200274 filed in Japan on Jul. 7, 2004, the contents of which are incorporated by this reference.

BACKGROUND OF THE INVENTION

The present invention relates generally to a zoom optical system and electronics incorporating the same, and more particularly to a compact zoom optical system and electronics incorporating the same. The electronics used herein, for instance, include digital cameras, digital video units, personal computers, mobile computers, cellular phones and personal digital assistants.

In recent years, personal digital assistants acronymed as PDAs and cellular phones have seen an astonishing explosion. Some such systems with built-in compact digital cameras or digital video units, too, have grown. For such digital cameras or digital video units, CCD (charge coupled device) or CMOS (complementary metal oxide semiconductor) sensors are now used as image pickup devices. In such digital cameras or the like, image pickup devices each with a receptor plane having a relatively small effective area are used. Accordingly, when the digital cameras or the like are made compact, a sensible tradeoff must be offered between size reductions and cost reductions while the performance of their optical systems is kept high. So far, a zoom optical system of the −+−+ construction has been available as one of slimmed-down, low-cost optical systems.

SUMMARY OF THE INVENTION

According to one aspect of the invention, there is provided a zoom optical system comprising, in order from its object side, a first lens group having negative refracting power,
a second lens group having positive refracting power,
a third lens group having negative refracting power, and
a fourth lens group having positive refracting power, wherein:

said second lens group consists of one positive lens, wherein said positive lens is formed of a material higher in refractive index than any of other lenses included in said first lens group and said third lens group.

According to another aspect of the invention, there is provided a zoom optical system comprising, in order from its object side, a first lens group having negative refracting power,
a second lens group having positive refracting power,
a third lens group having negative refracting power, and
a fourth lens group having positive refracting power, wherein:

said second lens group consists of one positive lens, wherein said positive lens is fabricated of a material that satisfies the following condition:

$$-30\times10^{-6} < dn_2/dT < 50\times10^{-6}$$

where $dn_2/dT$ is the temperature coefficient in °C.$^{-1}$ of the d-line refractive index of the positive lens in said second lens group.

According to yet another aspect of the invention, there is provided a zoom optical system comprising, in order from its object side, a first lens group having negative refracting power,
a second lens group having positive refracting power,
a third lens group having negative refracting power, and
a fourth lens group having positive refracting power, wherein:

said second lens group consists of one positive lens, and
said second lens group and said third lens group satisfy together the following condition:

$$-100 < HF_{23}/SD_{23} < -0.3$$

where $HF_{23}$ is the composite front principal point position of said second lens group and said third lens group at the wide-angle end (as measured from the vertex of the surface nearest to the object side of said second lens group), and $SD_{23}$ is the total sum of the thicknesses of lenses included in said second lens group and said third lens group.

According to a further aspect of the invention, there is provided a zoom optical system comprising, in order from its object side, a first lens group having negative refracting power,
a second lens group having positive refracting power,
a third lens group having negative refracting power, and
a fourth lens group having positive refracting power, wherein:

said second lens group consists of one positive lens, and
said first lens group satisfies the following condition:

$$-1 < SF_{G1} < 1$$

where $SF_{G1}$ is the shaping factor of said first lens group that is defined by $$SF_{G1} = (r_{G11} + r_{G12})/(r_{G11} - r_{G12})$$

where $r_{G11}$ is the radius of curvature of the surface located in said first lens group and nearest to its object side, and $r_{G12}$ is the radius of curvature of the surface located in said first lens group and nearest to its image side.

According to a further aspect of the invention, there is provided an electronic equipment, comprising:

the zoom optical system according to claim 1, and
an electronic image pickup device located on the image side thereof.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is a collection of lens arrangement sections of Example 1 of the zoom optical system according to the invention upon focusing on an infinite object point, wherein

FIG. 8 is a collection of aberration diagrams for Example 1 upon focusing on an infinite object point, wherein

DESCRIPTION OF THE PREFERRED EMBODIMENTS

Figure 1A:
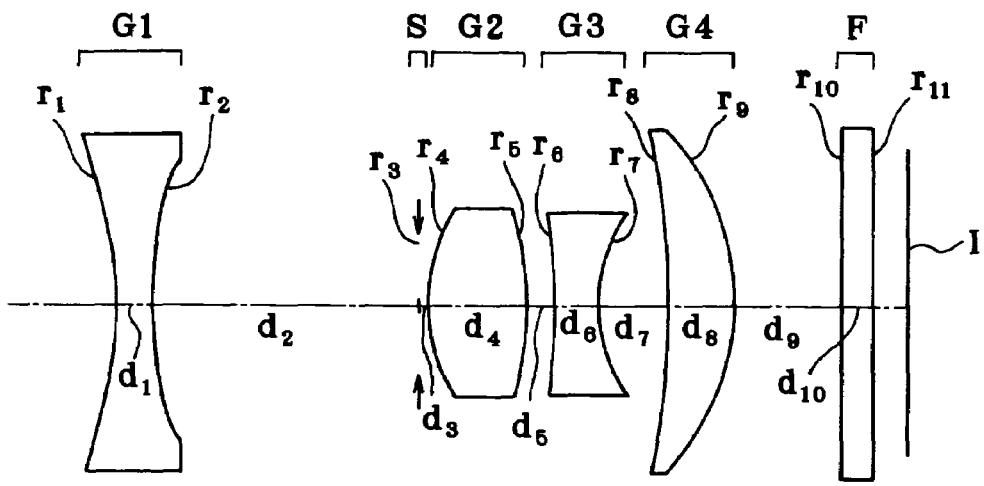
FIG. 1(a) is a sectional view at the wide-angle end (a)

Prior to explaining the zoom optical system of the invention with reference to its several embodiments, a common arrangement to them is now explained.

A zoom optical system of the negative-positive-negative-positive power profile is available. Such a zoom optical system having a fixed short total length can be achieved with a reduced number of lenses. Thus, the zoom optical system of the negative-positive-negative-positive power profile can be kept compact and less expensive.

In the invention, therefore, some embodiments of the zoom optical system, described below, are each comprised of, in order from its object side, a first lens group having negative refracting power, a second lens group having positive refracting power, a third lens group having negative refracting power and a fourth lens group having positive refracting power.

Preferably in each embodiment of the zoom optical system, the second lens group should consist of one positive lens. This allows the optical system to be constructed of a more reduced number of lenses, resulting in size reductions and cost reductions as well. In addition, the weight of the second lens group can be so reduced that zooming or focusing by its movement can be much more facilitated. Therefore, when an actuator or the like is used for movement of the zoom lens groups, its moving mechanism can be so slimmed down that the whole unit can be made compact.

Each embodiment of the zoom optical system is now explained.

The first zoom optical system of the invention comprises, in order from its object side, a first lens group having negative refracting power, a second lens group having positive refracting power, a third lens group having negative refracting power and a fourth lens group having positive refracting power, wherein the second lens group consists of one positive lens that is formed of a material higher in refractive index than any of other lenses included in the first lens group and the third lens group.

The advantage of, and the requirement for, the above arrangement is now explained.

If the positive lens in the second lens group has large power, then a compact optical system can be achieved because of a decrease in the amount of movement of the second lens group. However, there will be a large Petzval's sum leading to considerable field curvature. To avoid this, it is preferable to make the refractive index of the positive lens in the second lens group higher than that of any of other lenses included in the first lens group and the third lens group. This enables the Petzval's sum to become small, so that the field curvature can be effectively prevented while the optical system is kept compact.

Note here that the requirement that the positive lens in the second lens group be formed of a material higher in refractive index than any of other lenses included in the first lens group and the third lens group could also be applied to the second to the fourth optical system described below.

The second optical system of the invention comprises, in order from its object side, a first lens group having negative refracting power, a second lens group having positive refracting power, a third lens group having negative refracting power and a fourth lens group having positive refracting power, wherein the second lens group consists of one positive lens that is fabricated of a material that satisfies the following condition:

$$-30\times10^{-6} < dn_2/dT < 50\times10^{-6} \tag{1}$$

where $dn_2/dT$ is the temperature coefficient in $°C.^{-1}$ of the d-line refractive index of the positive lens in the second lens group.

The advantage of, and the requirement for, the above arrangement is now explained.

If the positive lens in the second lens group has large power, then a compact optical system can be achieved because of a decrease in the amount of movement of the second lens group. However, there will be an increased influence of refractive index changes with changing temperature, resulting in underperformance. An effort to construct the second lens group of a plurality of lenses in such a way as to cancel out the refractive index changes is not preferable, because the total length of the second lens group becomes long, failing to reduce the size of the optical system.

The satisfaction of condition (1) here is preferable, because there is a decrease in the amount of refractive index changes with changing temperature, which helps achieve size reductions with effective prevention of underperformance. Exceeding the upper limit of $50 \times 10^{-6}$ to condition (1) or falling short of the lower limit of $-30 \times 10^{-6}$ is not preferable, because the refractive index changes with changing temperature become large, leading to the inability to obtain any good performance.

More preferably, $$-20 \times 10^{-6} < dn_2/dT < 30 \times 10^{-6} \tag{1-2}$$

The satisfaction of this condition ensures that the amount of refractive index changes with changing temperature can be more reduced.

Even more preferably, $$-10 \times 10^{-6} < dn_2/dT < 10 \times 10^{-6} \tag{1-3}$$

The satisfaction of this condition ensures that the amount of refractive index changes with changing temperature can be much more reduced.

Note here that the above conditions (1), (1-2) and (1-3) should preferably be satisfied by not only the above first zoom optical system but also the third and fourth zoom optical systems described just below. This ensures that these zoom optical systems, too, provide similar advantages.

Preferably in the second zoom optical system, at least one negative lens included in the first lens group should be fabricated of a material that satisfies the following condition:

$$-30 \times 10^{-6} < dn_1/dT < 50 \times 10^{-6} \tag{2}$$

where $dn_1/dT$ is the temperature coefficient in $°C.^{-1}$ of the d-line refractive index of the negative lens in the first lens group.

The advantage of, and the requirement for, the above arrangement is now explained.

Although the first lens group is larger in lens diameter than the second or the third lens group, its entrance pupil position is nearer to the object side because of its power. This is preferable in that not only the effective lens diameter but also the total lens length can be shortened. However, there will be an increased influence of refractive index changes with changing temperature, leading to underperformance. The satisfaction of condition (2) here is preferable, because there is a decrease in the amount of refractive index changes with changing temperature of the negative lens in the first lens group, which helps achieve size reductions with effective prevention of underperformance. Exceeding the upper limit of $50 \times 10^{-6}$ to condition (2) or being shy of the lower limit of $-30 \times 10^{-6}$ is not preferable, because the refractive index changes with changing temperature become large, leading to the inability to obtain any good performance.

More preferably, $$-20 \times 10^{-6} < dn_1/dT < 30 \times 10^{-6} \tag{2-2}$$

The satisfaction of this condition ensures that the amount of refractive index changes with changing temperature can be more reduced.

Even more preferably, $$-10 \times 10^{-6} < dn_1/dT < 10 \times 10^{-6} \tag{2-3}$$

The satisfaction of this condition ensures that the amount of refractive index changes with changing temperature can be much more reduced.

Preferably in the second zoom optical system, at least one negative lens included in the third lens group should be fabricated of a material that satisfies the following condition:

$$-30 \times 10^{-6} < dn_3/dt < 50 \times 10^{-6} \tag{3}$$

where $dn_3/dT$ is the temperature coefficient in $°C.^{-1}$ of the d-line refractive index of the negative lens in the third lens group.

The advantage of, and the requirement for, the above arrangement is now explained.

As the negative lens in the third lens group has large power, the amount of movement of the third lens group becomes small, resulting in the achievement of a compact optical system. However, there will be an increased influence of refractive index changes with changing temperature, leading to underperformance. An effort to construct the third lens group of a plurality of lenses in such a way as to cancel out the refractive index changes is not preferable, because the total length of the third lens group becomes long, failing to reduce the size of the optical system. The satisfaction of condition (3) here is preferable, because there is a decrease in the amount of refractive index changes with changing temperature, which helps achieve size reductions with effective prevention of underperformance. Exceeding the upper limit of $50 \times 10^{-6}$ to condition (3) or falling short of the lower limit of $-30 \times 10^{-6}$ is not preferable, because the refractive index changes with changing temperature become large, leading to the inability to obtain any good performance.

More preferably, $$-20 \times 10^{-6} < dn_3/dT < 30 \times 10^{-6} \tag{3-2}$$

The satisfaction of this condition ensures that the amount of refractive index changes with changing temperature can be more reduced.

Even more preferably, $$-10 \times 10^{-6} < dn_3/dT < 10 \times 10^{-6} \tag{3-3}$$

The satisfaction of this condition ensures that the amount of refractive index changes with changing temperature can be much more reduced.

The third zoom optical system of the invention comprises, in order from its object side, a first lens group having negative refracting power, a second lens group having positive refracting power, a third lens group having negative refractive power and a fourth lens group having positive refracting power, wherein the second lens group consists of one positive lens, and the second lens group and the third lens group satisfy the following condition:

$$-100 < HF_{23}/SD_{23} < -0.3 \tag{4}$$

where $HF_{23}$ is the composite front principal point position of the second lens group and the third lens group at the wide-angle end (as measured from the vertex of the surface located in the second lens group and nearest to its object side), and $SD_{23}$ is the total sum of the thicknesses of the lenses included in the second lens group and the third lens group.

The advantage of, and the requirement for, the above arrangement is now explained.

The second lens group and the third lens group should preferably satisfy together condition (4). This is because the composite front principal point position of the second lens group and the third lens group comes so nearer to the first lens group that the space between the principal points of the first lens group and the composite principal points of the second lens group and the third lens group can be made narrow, leading to a decrease in the total lens length. Exceeding the upper limit of −0.3 to condition (4) is not preferable, because the composite principal points of the second lens group and the third lens group will shift toward the image side with a widening space between them and the principal points of the first lens group, ending up with a total length increase. Falling short of the lower limit of −100 is again not preferable, because the powers of the second lens group and the third lens group will become too strong, rendering the sensitivity to decentration unacceptably high.

More preferably, $$-50 < HF_{23}/SD_{23} < -0.35 \quad (4\text{-}2)$$

The satisfaction of this condition ensures that the total lens length can be more shortened.

Even more preferably, $$-30 < HF_{23}/SD_{23} < -0.37 \quad (4\text{-}3)$$

The satisfaction of this condition ensures that the total lens length can be much more shortened.

The fourth zoom optical system of the invention comprises, in order from its object side, a first lens group having negative refracting power, a second lens group having positive refracting power, a third lens group having negative refracting power and a fourth lens group having positive refracting power, characterized in that said second lens group consists of one positive lens, and said first lens group satisfies the following condition:

$$-1 < SF_{G1} < 1 \quad (5)$$

where $SF_{G1}$ is the shaping factor of the first lens group that is defined by $$SF_{G1} = (r_{G11} + r_{G12})/(r_{G11} - r_{G12})$$

where $r_{G11}$ is the radius of curvature of the surface located in the first lens group and nearest to its object side, and $r_{G12}$ is the radius of curvature of the surface located in the first lens group and nearest to its image side.

The advantage of, and the requirement for, the above arrangement is now explained.

The first lens group is larger in lens diameter than the second lens group or the third lens group. Here if power is given to the first lens group, then the entrance pupil position can be located nearer to the object side. Consequently, the effective lens diameter as well as the total lens length can be shortened. It is then preferable to satisfy condition (5), because the effective lens diameter can be shortened while performance is well kept. If the upper limit of 1 to condition (5) is exceeded, the negative power of that object-side surface will turn positive, causing the entrance pupil position to be positioned nearer to the image side. This will otherwise render the effective lens diameter larger. Thus, it is not preferable to exceed that upper limit. If the lower limit of −1 to condition (5) is not reached, the negative power of that object-side surface will become too strong. This will otherwise cause a lot more coma to occur at the wide-angle end, a lot more astigmatism to occur at the telephoto end, etc. In consideration of correction of aberrations, therefore, it is not preferable to fall short of that lower limit.

More preferably, $$-0.8 < SF_{G1} < 0.95 \quad (5\text{-}2)$$

The satisfaction of this condition ensures that the effective lens diameter can be more shortened while performance is well kept.

Even more preferably, $$-0.5 < SF_{G1} < 0.9 \quad (5\text{-}3)$$

The satisfaction of this condition ensures that the effective lens diameter can be much more shortened while performance is well kept.

It is also preferable for the first zoom optical system, and the second zoom optical system to satisfy the following conditions (5'), (5'-2) and (5'-3) in place of the above conditions (5), (5-2) and (5-3). In this regard, what is meant by their upper and lower limits are the same as explained with reference to the fourth zoom optical system.

$$-10 < SF_{G1} < 3 \quad (5')$$

More preferably, $$-1 < SF_{G1} < 1.5 \quad (5'\text{-}2)$$

Even more preferably, $$-0.5 < SF_{G1} < 1 \quad (5'\text{-}3)$$

It is also preferable for the third zoom optical system to satisfy the following conditions (5"), (5"-2) and (5"-3) in place of the above conditions (5), (5-2) and (5-3). In this regard, what is meant by their upper and lower limits are the same as explained with reference to the fourth zoom optical system.

$$-10 < SF_{G1} < 1 \quad (5'')$$

More preferably, $$-1 < SF_{G1} < 1 \quad (5''\text{-}2)$$

Even more preferably, $$-0.5 < SF_{G1} < 1 \quad (5''\text{-}3)$$

The requirements common to the first to fourth zoom optical systems of the invention are now explained. Each zoom optical system should preferably have these requirements.

At least one negative lens included in the first lens group should preferably have an aspheric surface applied to its object-side surface.

The advantage of, and the requirement for, the above arrangement is now explained.

Light rays at the first lens group gain height at the wide-angle end. It is therefore preferable to apply an aspheric surface to the object-side surface of the negative lens. It is thus possible to implement satisfactory correction of off-axis aberrations such as coma.

At the telephoto end, on the other hand, a light beam at the first lens group has a large diameter. It is therefore preferable to apply an aspheric surface to the object-side surface of the negative lens. It is thus possible to implement satisfactory correction of spherical aberrations, etc.

At least one negative lens included in the first lens group should preferably have an aspheric surface applied to its image-side surface.

The advantage of, and the requirement for, the above arrangement is now explained.

Light rays at the first lens group gain height at the wide-angle end. It is therefore preferable to apply an aspheric surface to the image-side surface of the negative lens. It is thus possible to make satisfactory correction of off-axis aberrations such as coma.

At the telephoto end, on the other hand, a light beam at the first lens group has a large diameter. It is therefore preferable to apply an aspheric surface to the image-side surface of the negative lens. It is thus possible to make satisfactory correction of spherical aberrations, etc.

At least one negative lens included in the first lens group should preferably be a lens fabricated of a resinous material.

The advantage of, and the requirement for, the above arrangement is now explained. A resinous material lens can be fabricated at lower costs than glass lenses. This is the reason at least one negative lens included in the first lens group should preferably be fabricated of a resinous material.

At least one negative lens included in the first lens group should preferably be fabricated of a material that satisfies the following condition:

$$40 < v_{d1} < 100 \tag{6}$$

where $v_{d1}$ is the Abbe constant of the negative lens in the first lens group.

The advantage of, and the requirement for, the above arrangement is now explained.

Since the first lens group has negative power, there is some considerable chromatic aberration of magnification occurring at the wide-angle end in particular. Composing the first lens group of one negative lens is preferable for compactness; however, it is impossible to reduce the amount of chromatic aberration of magnification produced by locating a positive lens in the first lens group. Therefore, it is preferable for the negative lens in the first lens group to satisfy condition (6). The satisfaction of this condition (6) ensures that the amount of chromatic aberration of magnification produced is minimized. There is no such a material as to exceed the upper limit of 100 to condition (6). As the lower limit of 40 is not reached, the chromatic aberration of magnification occurring at the first lens group becomes too large. In order to hold back chromatic aberration of magnification throughout the optical system, therefore, a lot more lenses are required.

More preferably, $$50 < v_{d1} < 100 \tag{6-2}$$

With condition (6-2) satisfied, the amount of chromatic aberration of magnification produced can be more reduced.

Even more preferably, $$55 < v_{d1} < 100 \tag{6-3}$$

With condition (6-3) satisfied, the amount of chromatic aberration of magnification produced can be much more reduced.

Preferably, at least one negative lens included in the first lens group should satisfy the following condition:

$$0.5 < |f_1|/f_w < 5 \tag{7}$$

where:

$f_1$, is the focal length of the negative lens in the first lens group, and $f_w$ is the focal length of the zoom optical system as calculated at the wide-angle end, viz., $f_w$ is defined by $f_w = (Y_h \times 0.6)/\tan \omega$ where $Y_h$ is the maximum image height and $\omega$ is the half angle of view of a light ray incident at a 60% position of the maximum image height.

The advantage of, and the requirement for, the above arrangement is now explained.

The first lens group is larger in lens diameter than the second lens group or the third lens group. Here if power is given to the first lens group, then the entrance pupil position can be located nearer to the object side. Consequently, the effective lens diameter as well as the total lens length can be shortened. It is then preferable to satisfy condition (7), because the effective lens diameter can be shortened while performance is well kept. If the upper limit of 5 to condition (7) is exceeded, the negative power will become too strong, causing a lot more come to occur at the wide-angle end, a lot mote astigmatism to occur at the telephoto end, etc. Thus, it is not preferable for correction of aberrations to exceed that upper limit. If the lower limit of 0.5 to condition (7) is not reached, the negative power will then become too weak to shorten the effective lens diameter and the total lens length sufficiently. Therefore, it is not preferable to fall short of that lower limit.

More preferably, $$1 < |f_1|/f_w < 3 \tag{7-2}$$

As this condition (7-2) is satisfied, the effective lens diameter as well as the total lens length can be more shortened while performance is well kept.

Even more preferably, $$1.4 < |f_1|/f_w < 2.5 \tag{7-3}$$

As this condition (7-3) is satisfied, the effective lens diameter as well as the total lens length can be much more shotened while performance is well kept.

Preferably, the first lens group should comprise at least one positive lens.

The advantage of, and the requirement for, the above arrangement is now explained.

The first lens group is larger in lens diameter than the second lens group or the third lens group. Here if the negative refracting power of the first lens group is increased, the entrance pupil position can then be located nearer to the object side with the result that the effective lens diameter as well as the total lens length can be shortened. As the power of the negative lens in the first lens group grows large, however, there is a lot more chromatic aberration of magnification, which is not preferable for correction of aberrations. Therefore, it is preferable to locate a positive lens in the first lens group, so that the amount of chromatic aberration of magnification at the first lens group can be reduced.

Preferably, at least one positive lens in the first lens group should be located nearest to its image side.

The advantage of, and the requirement for, the above arrangement, is now explained. As the positive lens is located nearest to the image side of the first lens group, fluctuations of spherical aberrations and various other aberrations such as coma and chromatic aberration of magnification with zooming can be held back.

Preferably, the positive lens in the second lens group should have an aspheric surface on its image side.

The advantage of, and the requirement for, the above arrangement is now explained.

A light beam through the second lens group has a large diameter. Therefore, it is preferable for that positive lens to have an aspheric surface on its image side. This allows for good correction of spherical aberrations, etc. at the wide-angle end in particular.

Further, as the positive lens in the second lens group has large power, it enables the amount of movement of the second lens group to be so decreased that a compact optical system is achievable. If the positive lens in the second lens group has large power, however, a lot more aberrations such as astigmatism and coma will occur. It is therefore preferable to locate an aspheric surface on the image side of the positive lens. This allows for good correction of aberrations such as coma and astigmatism at the wide-angle end in particular.

Preferably, the second lens group should satisfy the following condition:

$$-5 < SF_2 < 1 \quad (8)$$

where $SF_2$ is the shaping factor of the positive lens in the second lens group; that is, it is defined by $$SF_2 = (r_{21} + r_{22})/(r_{21} - r_{22})$$

where:

$r_{21}$ is the radius of curvature of the object-side surface of the positive lens in the second lens group, and $r_{22}$ is the radius of curvature of the image-side surface of the positive lens in the second lens group.

The advantage of, and the requirement for, the above arrangement is now explained.

As the positive lens in the second lens group satisfies condition (8), it enables the positive refracting power of that image-side surface to be decreased, providing such advantages as mentioned at (1) and (2) below:

(2) the principal point positions shift toward the first lens group side with a narrowing space between the principal points of the first lens group and the second lens group, leading to a decreased total lens length; and (2) the magnification of the second lens group can be so increased that the amount of movement of the second lens group in association with zooming can be reduced, again leading to a decreased total lens length.

If the upper limit of 1 to condition (8) is exceeded, then the positive refracting power of the image-side surface will grow large. This will in turn cause a reduction in the magnification of the second lens group, resulting in a decreased zoom ratio. If the lower limit of −5 is not reached, then a lot more astigmatism will occur at the object-side surface and a lot more coma will occur at the image-side surface, resulting in the need of using a lot more lenses for their correction.

More preferably, $$-1 < SF_2 < 0.5 \quad (8\text{-}2)$$

The satisfaction of this condition (8-2) ensures that the optical system is made more compact.

More preferably, $$-0.5 < SF_2 < 0 \quad (8\text{-}3)$$

The satisfaction of this condition (8-3) ensures that the optical system is made much more compact.

Preferably, the positive lens in the second lens group should be fabricated of a material that satisfies the following condition:

$$35 < v_{d2} < 100 \quad (9)$$

where $v_{d2}$ is the Abbe constant of the positive lens in the second lens group.

The advantage of, and the requirement for, the above arrangement is now explained.

As the positive lens in the second lens group has large power, it allows the amount of movement of the second lens group to become small with the result that a compact optical system is achievable. As the power of the positive lens in the second lens group grows large, however, it causes a lot more longitudinal chromatic aberration to occur. For the positive lens in the second lens group, it is therefore preferable to satisfy condition (9). The satisfaction of this condition ensures that the amount of longitudinal chromatic aberration produced can be minimized. There is no such a material as to exceed the upper limit of 100 to condition (9). As the lower limit of 35 is not reached, the longitudinal chromatic aberration occurring at the second lens group becomes too large. In order to hold back the longitudinal chromatic aberration throughout the optical system, therefore, a lot more lenses are required. Thus, falling short of that lower limit is not preferable.

More preferably, $$40 < v_{d2} < 100 \quad (9\text{-}2)$$

With condition (9-2) satisfied, the amount of longitudinal chromatic aberration of magnification produced can be more reduced.

Even more preferably, $$45 < v_{d2} < 100 \quad (9\text{-}3)$$

With condition (9-3) satisfied, the amount of longitudinal chromatic aberration produced can be much more reduced.

Preferably, the positive lens in the second lens group should satisfy the following condition:

$$0.3 < f_2/f_w < 1.3 \quad (10)$$

where:

$f_2$ is the focal length of the positive lens in the second lens group, and $f_w$ is the focal length of the zoom optical system as calculated at the wide-angle end, viz., $f_w$ is defined by $f_w = (Y_h \times 0.6)/\tan \omega$ where $Y_h$ is the maximum image height and ω is the half angle of view of a light ray incident at a 60% position of the maximum image height.

The advantage of, and the requirement for, the above arrangement is now explained.

As the positive lens in the second lens group has large power, it allows the amount of movement of the second lens group to become small with the result that a compact optical system is achievable. As the power of the positive lens in the second lens group grows large, a lot more longitudinal chromatic aberration and a lot more aberrations such as coma and astigmatism occur. It is therefore preferable to satisfy condition (10). The satisfaction of this condition ensures that a compact optical system is achievable while its performance is well kept. If the upper limit of 1.3 to condition (10) is exceeded, that positive power will then become too large. This in turn will incur increases in the longitudinal chromatic aberration, and aberrations such as coma and astigmatism at the wide-angle end. Therefore, exceeding that upper limit is not preferable for correction of aberrations. If the lower limit of 0.3 to condition (10) is not reached, that positive power will then wane. This in turn will cause the amount of movement of the second lens group to become large, resulting in the inability to shorten the total lens length sufficiently. Therefore, falling short of that lower limit is again not preferable.

More preferably, $$0.4<|f_2|/f_W<1 \tag{10-2}$$

The satisfaction of this condition (10-2) ensures that the effective lens diameter as well as the total lens length can be more shortened while performance is well kept.

Even more preferably, $$0.5<|f_2|/f_W<0.9 \tag{10-3}$$

The satisfaction of this condition (10-3) ensures that the effective lens diameter as well as the total lens length can be much more shortened while performance is well kept.

Preferably, at least one negative lens in the third lens group should be fabricated of a resinous material.

The advantage of, and the requirement for, the above arrangement is now explained. A resinous material lens can be fabricated more inexpensively than glass lenses. Therefore, at least one negative lens in the third lens group should preferably have been fabricated of a resinous material.

Preferably, the negative lens in the third lens group should satisfy the following condition:

$$-1<SF_3<10 \tag{11}$$

where $SF_3$ is the shaping factor of the negative lens in the third lens group; that is, it is defined by $$SF_3=(r_{31}+r_{32})/(r_{31}-r_{32})$$

where:

$r_{31}$ is the radius of curvature of the object-side surface of the negative lens in the third lens group, and $r_{32}$ is the radius of curvature of the image-side surface of the negative lens in the third lens group.

The advantage of, and the requirement for, the above arrangement is now explained.

As condition (11) is satisfied, it allows the principal point positions of the negative lens in the third lens group to be located nearer to the object side with a narrowing space between the principal points of the second lens group and the third lens group, leading to a decreased total lens length. If the upper limit of 10 to condition (11) is exceeded, there will then large fluctuations of various aberrations such as astigmatism produced at the image-side surface. Therefore, exceeding that upper limit is not preferable for correction of aberrations. As the lower limit of −1 is not reached, it causes the principal points of the negative lens in the third lens group to be positioned on the image side with a widening space between the principal points of the second lens group and the third lens group, leading to an increased total lens length. Therefore, falling short of that lower limit is not preferable.

More preferably, $$-0.5<SF_3<5 \tag{11-2}$$

The satisfaction of this condition (11-2) makes the optical system more compact.

Even more preferably, $$0<SF_3<2 \tag{11-3}$$

The satisfaction of this condition (11-3) makes the optical system much more compact.

Preferably, at least one negative lens in the third lens group should be fabricated of a material that satisfies the following condition:

$$0<v_{d3}<45 \tag{12}$$

where $v_{d3}$ is the Abbe constant of the negative lens in the third lens group.

The advantage of, and the requirement for, the above arrangement is now explained.

For compactness, the first lens group should be composed of as small a number of lenses as possible. Most preferably, the first lens group should be composed of one negative lens. If the first lens group is constructed of one negative lens, however, a lot more chromatic aberration of magnification will occur, and longitudinal chromatic aberration will occur at the second lens group. Therefore, if condition (12) is satisfied, it will then be possible to implement satisfactory correction of chromatic aberration of magnification even with the first lens group composed of one negative lens. What is more, longitudinal chromatic aberration occurring at the second lens group will be well correctable, too. As the upper limit of 45 to condition (12) is exceeded, it renders it impossible to implement satisfactory correction of chromatic aberration of magnification occurring at the first lens group and longitudinal chromatic aberration occurring at the second lens group. Therefore, exceeding that upper limit is not preferable. Especially if correction of the longitudinal chromatic aberration produced at the second lens group does not work, there will then be some considerable fluctuations of the longitudinal chromatic aberration with zooming. This in turn will cause considerable deterioration in image quality at an image center. Therefore, exceeding that upper limit is not preferable. There is no such a material as to be shy of the lower limit of 0.

More preferably, $$0<v_{d3}<40 \tag{12-2}$$

The satisfaction of this condition (12-2) ensures that the chromatic aberrations produced at the first and second lens groups are better correctable.

Even more preferably, $$0<v_{d3}<35 \tag{12-3}$$

The satisfaction of this condition (12-3) ensures that the chromatic aberrations produced at the first and second lens groups are much better correctable.

Preferably, at least one positive lens in the fourth lens group should be fabricated of a resinous material.

The advantage of, and the requirement for, the above arrangement is now explained. A resinous material lens can be fabricated more inexpensively than glass lenses. Therefore, at least one positive lens in the fourth lens group should preferably have been fabricated of a resinous material.

Preferably, at least one lens in the fourth lens group should satisfy the following condition:

$$-1<SF_4<10 \tag{13}$$

where $SF_4$ is the shaping factor of the positive lens in the fourth lens group; that is, it is defined by $$SF_4=(r_{41}+r_{42})/(r_{41}-r_{42})$$

Where:

$r_{41}$ is the radius of curvature of the object-side surface of the positive lens in the fourth lens group, and $r_{42}$ is the radius of curvature of the image-side surface of the positive lens in the fourth lens group.

The advantage of, and the requirement for, the above arrangement is now explained.

In order to reduce the amount of aberrations produced at the third lens group, light rays through the third lens group should preferably be of low height. It is then preferable for the fourth lens group to satisfy condition (13). With the satisfaction of this condition, the positive refracting power of that object-side surface becomes small, resulting in a decrease in the amount of coma, astigmatism and other aberrations produced there. If the upper limit of 10 to condition (13) is exceeded, the negative refracting power of that object-side surface will then become too large. In this case, coma, astigmatism and other aberrations will remain over-corrected; that is, they will be more produced on the opposite-sign side to where condition (13) is satisfied. Worse yet, the sensitivity to decentration will also become high. If the lower limit of −1 is not reached, the positive refracting power of that object-side surface will grow large. In this case, various aberrations such as coma and astigmatism will grow more, and a lot more lenses will be needed for correction of various such aberrations. Therefore, falling short of that lower limit is not preferable.

More preferably, $$0 < SF_4 < 7 \tag{13-2}$$

The satisfaction of this condition (13-2) ensures that the amount of various aberrations produced can be more reduced.

Even more preferably, $$0.5 < SF_4 < 4 \tag{13-3}$$

The satisfaction of this condition (13-3) ensures that the amount of various aberrations produced can be much more reduced.

Preferably, at least one positive lens in the fourth lens group should be fabricated of a material that satisfies the following condition:

$$40 < \nu_{d4} < 100 \tag{14}$$

where $\nu_{d4}$ is the Abbe constant of the positive lens in the fourth lens group.

The advantage of, and the requirement for, the above arrangement is now explained.

For compactness, the first lens group should also be composed of as small a number of lenses as possible. Most preferably, the first lens group should be composed of one negative lens. If the first lens group is constructed of one negative lens, however, a lot more chromatic aberration of magnification will occur at the wide-angle end in particular. An effort to correct this chromatic aberration of magnification with the negative refracting power of the third lens group here will result in over-correction at the telephoto end. Therefore, it is preferable to satisfy condition (14), because the occurrence of chromatic aberration of magnification due to overcorrection at the telephoto end can be well held back. There is no such a material as to exceed the upper limit of 100 to condition (14). Falling short of the lower limit of 40 will render it impossible to hold back chromatic aberration of magnification occurring at the telephoto end or a lot more lenses will be needed for its correction. Therefore, falling short of that lower limit is not preferable.

More preferably, $$45 < \nu_{d4} < 100 \tag{14-2}$$

The satisfaction of this condition (14-2) ensures that the occurrence of chromatic aberration of magnification is more held back.

Even more preferably, $$50 < \nu_{d4} < 100 \tag{14-3}$$

The satisfaction of this condition (14-3) ensures that the occurrence of chromatic aberration of magnification is much more held back.

Preferably, the axial position of the first lens group should remain fixed during zooming.

The advantage of, and the requirement for, the above arrangement is now explained. With the axial position of the first lens group remaining fixed during zooming, it is possible to cut back on the number of moving means such as actuators. Consequently, the size and cost of the whole optical system including the moving means, etc. can be much more reduced.

Preferably, the space between the second lens group and the third lens group should remain constant during zooming.

The advantage of, and the requirement for, the above arrangement is now explained.

It is preferable for the second lens group and the third lens group to have large power, because the amount of their movement becomes small. However, the sensitivity to decentration also becomes high, often leading to underperformance. Therefore, it is preferable to keep the space between the second lens group and the third lens group constant during zooming. This allows the second lens group and the third lens group to move in unison so that their relative decentration can be held back. Consequently, any underperformance can be effectively avoided.

Preferably, the zoom optical system of the invention should satisfy the following condition:

$$-35 < DT_{min} < 20 \tag{15}$$

where $DT_{min}$ is the amount of distortion in %.

The advantage of, and the requirement for, the above arrangement is now explained.

To achieve a wide angle-of-view layout while distortion is electrically corrected, it is preferable to satisfy condition (15). The satisfaction of this condition ensures that when distortion is electrically corrected, a wide angle-of-view layout with satisfactory image quality is achievable. If the upper limit of 20% to condition (15) is exceeded, then plus distortion will be produced at the wide-angle end. In this case, even electrical correction of distortion will never result in the achievement of any wide angle-of-view layout. As the lower limit of −30% is not reached, it causes the enlargement factor of the most peripheral portion of an image to become large, and an image with electrically corrected distortion becomes rough. Therefore, falling short of that lower limit is not preferable. Preferably, minus distortion should be produced at the wide-angle end. FIGS. 15(a) to 15(d) are indicative of distortions and depict some examples of $DT_{min}$.

More preferably, $$-30 < DT_{min} 0 \tag{15-2}$$

The satisfaction of this condition (15-2) ensures that a wider angle-of-view layer is achievable without rendering images rough.

Even more preferably, $$-27 < DT_{min} < -5 \tag{15-3}$$

The satisfaction of this condition (15-3) ensures that a much wider angle-of-view layout is achievable without rendering images rough.

Preferably, the optical system should be electrically corrected for distortion occurring there.

The advantage of, and the requirement for, the above arrangement is now explained.

An effort at implementing good correction for distortion with the optical system will result in a lot more lenses, rendering the optical system bulky. Electrical correction of a portion of distortion remaining undercorrected with the optical system is preferable, because the optical system can be made more compact.

A retrofocus type, because of having large negative distortion at the wide-angle end, is likely to have a wide angle-of-view layout and high magnifications when image distortion is electrically corrected. Therefore, the optical system should preferably be of the retrofocus type.

Preferably, the optical system should preferably be corrected for chromatic aberration of magnification occurring there.

The advantage of, and the requirement for, the above arrangement is now explained.

When the first lens group is constructed of one negative lens, chromatic aberration of magnification is produced a lot more at the wide-angle end. An effort here to implement good correction for the chromatic aberration of magnification with the optical system will end up with a lot more lenses, rendering the optical system bulky. Therefore, it is preferable to implement electrical correction for a portion of the chromatic aberration of magnification remaining undercorrected with the optical system. This in turn allows for a more compact optical system. Note that for electrical correction of the chromatic aberration of magnification, only image size matching be needed for each color. Image size changes may be carried out using a field curvature correction technique.

Preferably, an organic-inorganic composite material should be used as an optical material of at least one optical element that forms a part of the optical system.

The advantage of, and the requirement for, the above arrangement is now explained.

As the organic-inorganic composite material is used as the optical material of the optical element, it allows various optical properties (refractive index, chromatic dispersion) to come out (be obtained) depending on the types and content ratios of the organic component and the inorganic component. This ensures that if the organic component and the inorganic component are combined at any desired ratio, it is then possible to obtain various optical properties; various aberrations can be corrected with a more reduced number of optical elements, viz., at lower cost and smaller size.

Preferably, the organic-inorganic composite material should contain nano-particles of zirconia.

Preferably, the organic-inorganic composite material should contain nano-particles of zirconia and alumina.

Preferably, the organic-inorganic composite material should contain nano-particles of a niobium oxide.

Preferably, the organic-inorganic composite material should contain nano-particles of a hydrolyzate of zirconium alkoxide and alumina.

The advantage of, and the requirement for, the above arrangement is now explained. The nano-particles of these materials are some examples of the inorganic component. If such nano-particles are dispersed throughout a plastic material that is one example of the organic component at a given content ratio, then various optical properties (refractive index, chromatic dispersion) are allowed to come out.

Preferably, the electronic system of the invention should comprise one of the above zoom optical systems and an electronic image pickup device located on its image side.

The advantage of, and the requirement for, the above arrangement is now explained. Any of the above zoom optical systems is reduced in size and cost. Therefore, an electronic system with such a zoom optical system built in it as an imaging optical system, too, can be reduced in size and cost. The electronic system, for instance, includes digital cameras, video cameras, digital video units, personal computers, mobile computers, cellular phones and personal digital assistants.

Examples 1–7 of the inventive zoom optical system are now explained with reference to the accompanying drawings. FIGS. 1–7 are illustrative in lens arrangement sections along the optical axes of Examples 1–7 at their wide-angle ends (a), in their intermediate settings (b) and at their telephoto ends (c), respectively, upon focusing on an infinite object point. Throughout FIGS. 1–7, the first lens group is indicated by G1, an aperture stop by S, the second lens group by G2, the third lens group by G3, the fourth lens group by G4, a group of plane-parallel plates such as a near-infrared cut filter, a low-pass filter and a cover glass for an electronic image pickup device by F, and an image plane by I. FIGS. 8–14 are aberration diagrams indicative of spherical aberrations (SA), astigmatisms (AS), distortions (DT) and chromatic aberrations of magnification (CC) of Examples 1–7 at their wide-angle ends (a), in their intermediate settings (b) and at their telephoto ends (c), respectively, upon focusing on an infinite object point. In these aberration diagrams, "FIY" is indicative of an image height.

EXAMPLE 1

Figure 1B:
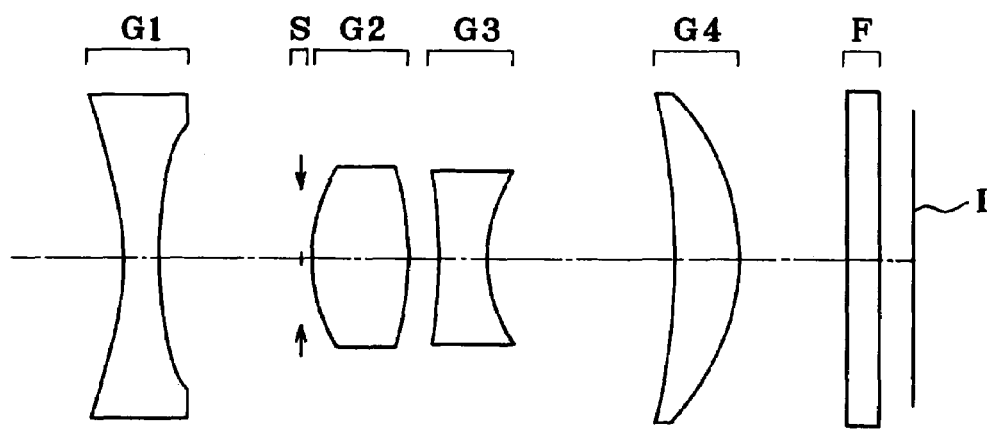
FIG. 1(b) is a sectional view in an intermediate setting (b)
Figure 1C:
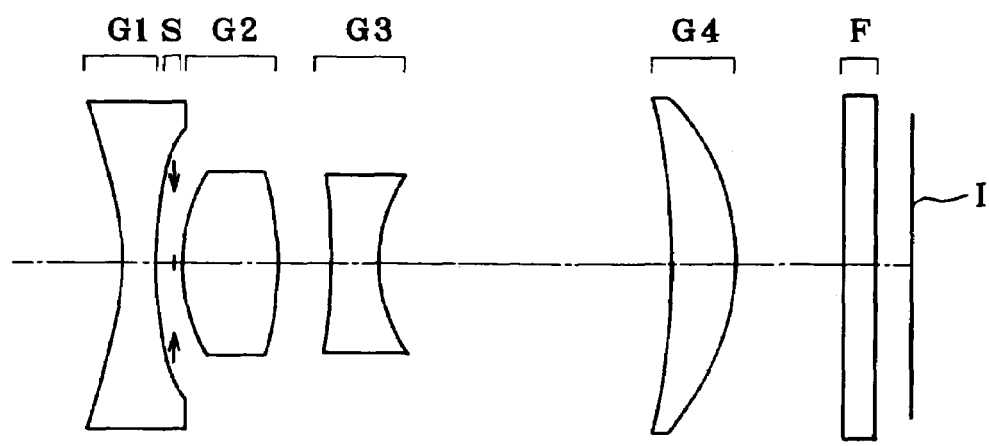
FIG. 1(c) is a sectional view at the telephoto end (c).

As shown in FIG. 1, Example 1 is directed to a zoom optical system made up of, in order from its object side, a first lens group G1, an aperture stop S, a second lens group G2, a third lens group G3 and a fourth lens group G4. Upon zooming from the wide-angle end to the telephoto end of the zoom optical system, the first lens group G1 remains fixed; the second lens group G2 moves together with the aperture stop S monotonously toward the object side; the third lens group G3 moves toward the object side with a slightly widening space between it and the second lens group G2; and the fourth lens group G4 remains fixed.

The first lens group G1 is composed of a double-concave negative lens and has negative power. Both surfaces of the double-concave negative lens are aspheric surfaces.

The second lens group G2 is composed of a double-convex positive lens and has positive power. Both surfaces of the double-convex positive lens are aspheric surfaces.

The third lens group G3 is composed of a double-concave negative lens and has negative power. The image-side surface of the double-concave negative lens is an aspheric surface.

The fourth lens group G4 is composed of a positive meniscus lens concave on its object side and has positive power. The image-side surface of this positive meniscus lens is an aspheric surface.

The lenses used here are all fabricated of a resinous material except the double-convex positive lens in the second lens group G2, which is fabricated of a glass material.

EXAMPLE 2

Figure 2A:
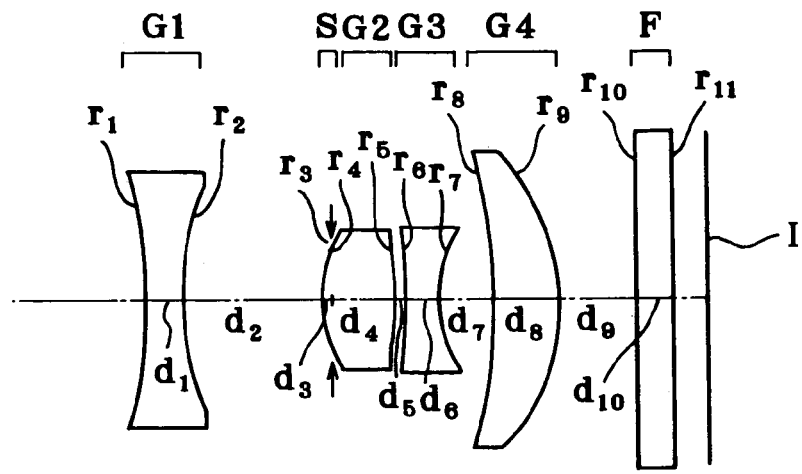
FIG. 2 is a collection of lens arrangement sections illustrative of Example 2 of the inventive zoom optical system, as in FIG. 1.
Figure 2B:
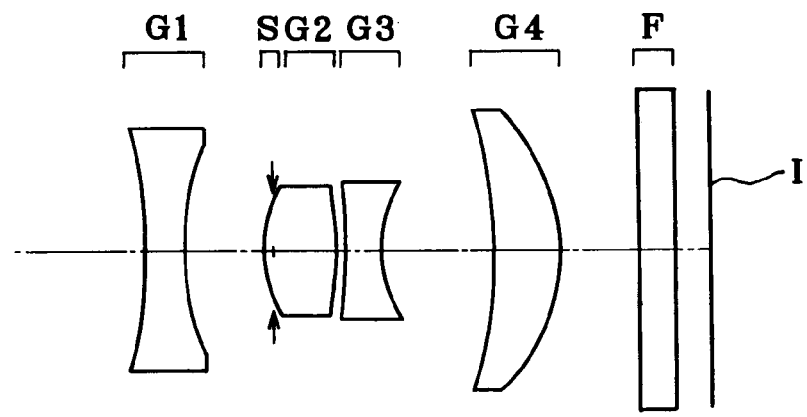
Figure 2C:
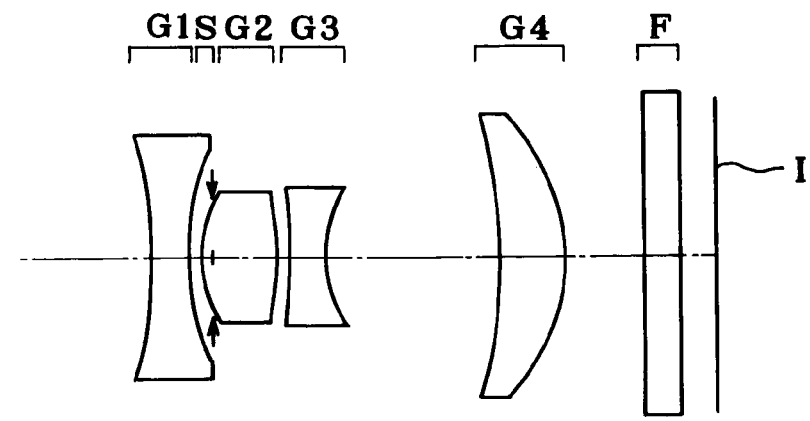

As shown in FIG. 2, Example 2 is directed to a zoom optical system made up of, in order from its object side, a first lens group G1, an aperture stop S, a second lens group G2, a third lens group G3 and a fourth lens group G4. Upon zooming from the wide-angle end to the telephoto end of the zoom optical system, the first lens group G1 remains fixed; the second lens group G2 moves together with the aperture stop S monotonously toward the object side; the third lens group G3 moves toward the object side in such a way that the space between it and the second lens group G2 becomes first slightly narrow and then wide; and the fourth lens group G4 remains fixed.

The first lens group G1 is composed of a double-concave negative lens and has negative power. Both surfaces of the double-concave negative lens are aspheric surfaces.

The second lens group G2 is composed of a double-convex positive lens and has positive power. Both surfaces of the double-convex positive lens are aspheric surfaces.

The third lens group G3 is composed of a double-concave negative lens and has negative power. The image-side surface of the double-concave negative lens is an aspheric surface.

The fourth lens group G4 is composed of a positive meniscus lens concave on its object side and has positive power. The image-side surface of this positive meniscus lens is an aspheric surface.

The lenses used here are all fabricated of a resinous material except the double-convex positive lens in the second lens group G2, which is fabricated of a glass material.

EXAMPLE 3

Figure 3A:
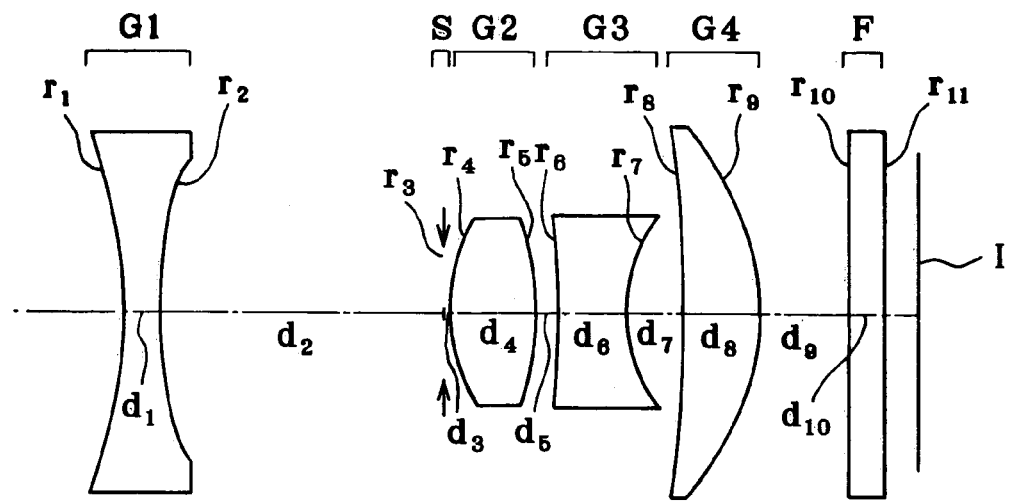
FIG. 3 is a collection of lens arrangement sections illustrative of Example 3 of the inventive zoom optical system, as in FIG. 1.
Figure 3B:
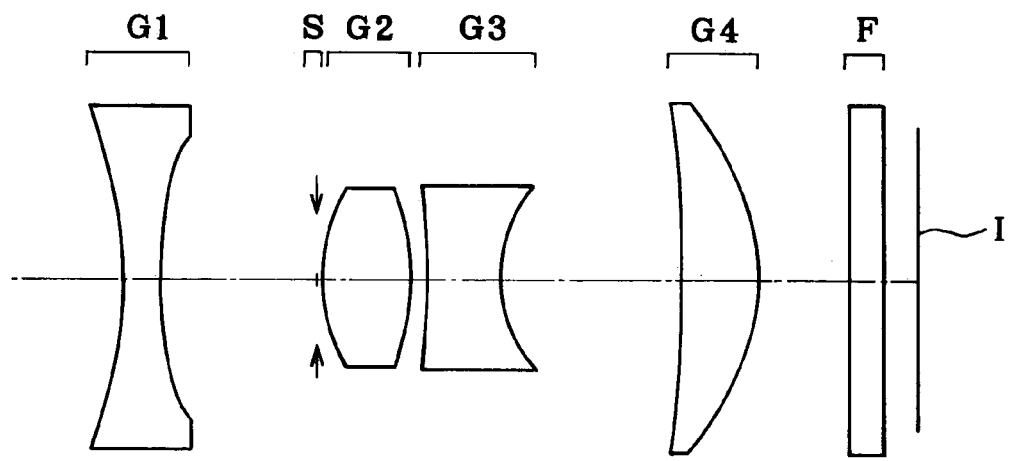
Figure 3C:
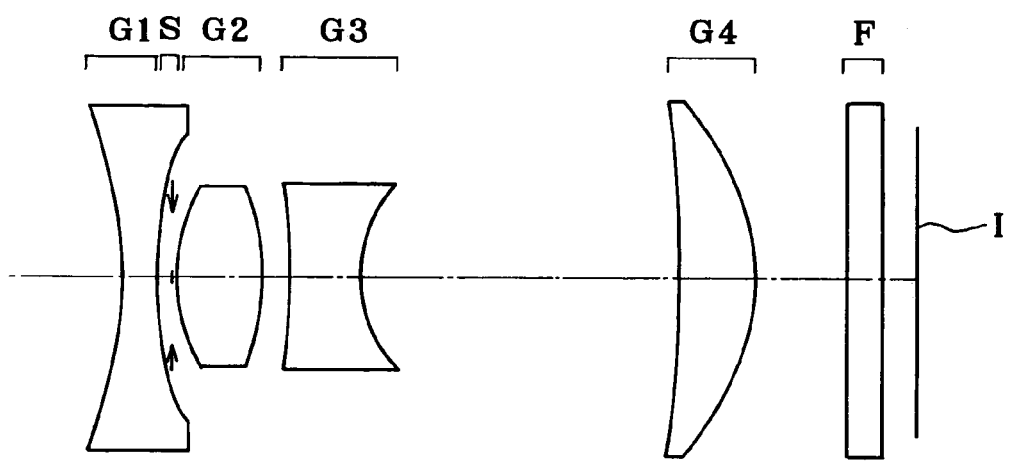

As shown in FIG. 3, Example 3 is directed to a zoom optical system made up of, in order from its object side, a first lens group G1, an aperture stop S, a second lens group G2, a third lens group G3 and a fourth lens group G4. Upon zooming from the wide-angle end to the telephoto end of the zoom optical system, the first lens group G1 remains fixed; the second lens group G2 moves together with the aperture stop S monotonously toward the object side; the third lens group G3 moves toward the object side in such a way that the space between it and the second lens group G2 becomes first slightly narrow and then wide; and the fourth lens group G4 remains fixed.

The first lens group G1 is composed of a double-concave negative lens and has negative power. Both surfaces of the double-concave negative lens are aspheric surfaces.

The second lens group G2 is composed of a double-convex positive lens and has positive power. Both surfaces of the double-convex positive lens are aspheric surfaces.

The third lens group G3 is composed of a double-concave negative lens and has negative power. The image-side surface of the double-concave negative lens is an aspheric surface.

The fourth lens group G4 is composed of a positive meniscus lens concave on its object side and has positive power. The image-side surface of this positive meniscus lens is an aspheric surface.

The lenses used here are all fabricated of a resinous material except the double-concave negative lens in the first lens group G1 and the double-convex positive lens in the second lens group G2, which are fabricated of a glass material.

EXAMPLE 4

Figure 4A:
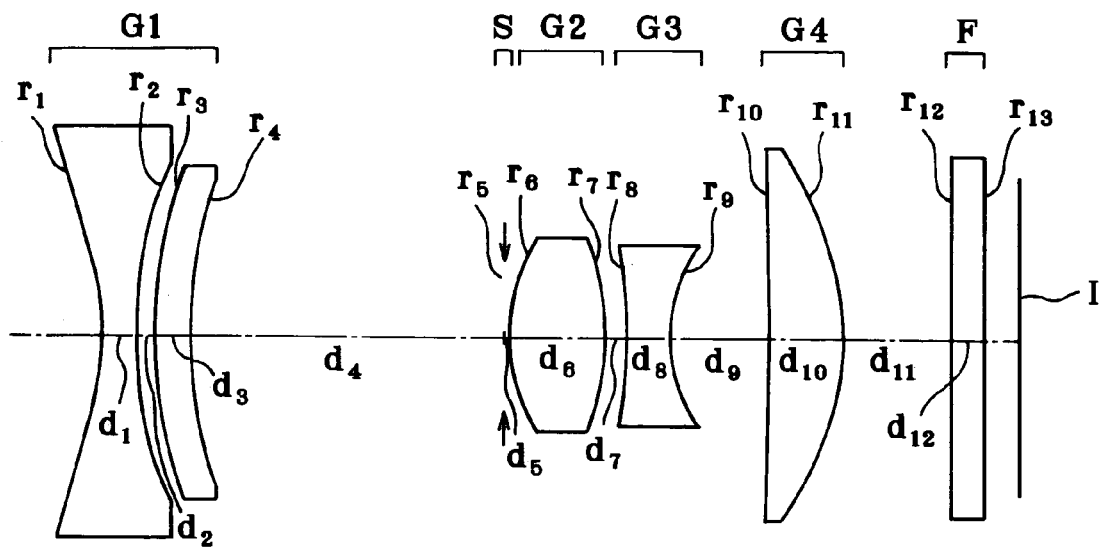
FIG. 4 is a collection of lens arrangement sections illustrative of Example 4 of the inventive zoom optical system, as in FIG. 1.
Figure 4B:
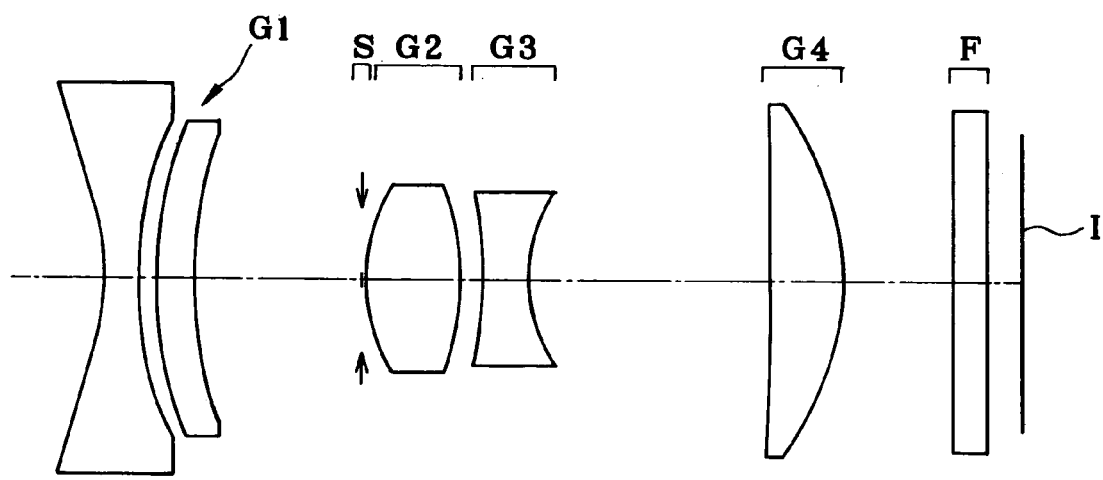
Figure 4C:
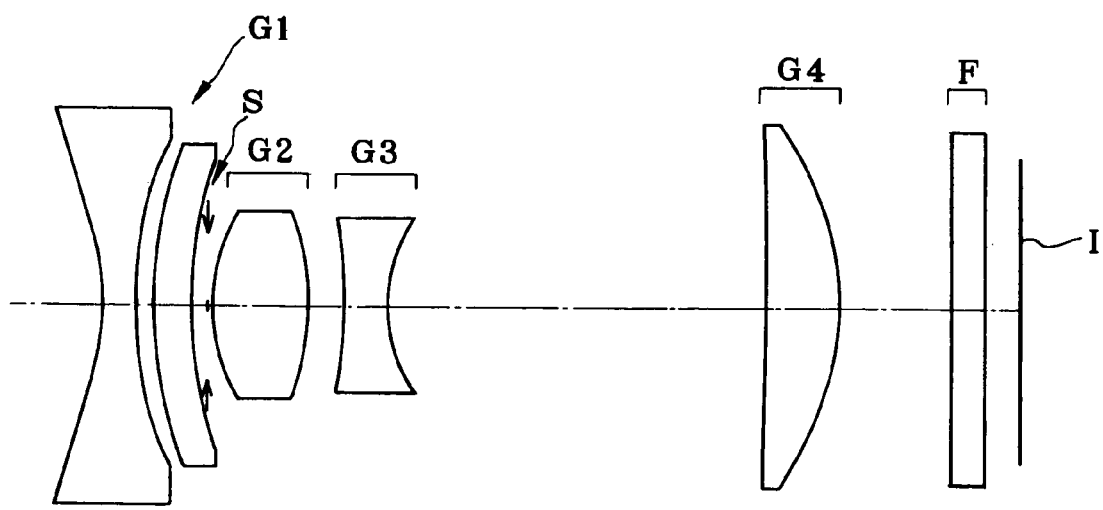

As shown in FIG. 4, Example 4 is directed to a zoom optical system made up of, in order from its object side, a first lens group G1, an aperture stop S, a second lens group G2, a third lens group G3 and a fourth lens group G4. Upon zooming from the wide-angle end to the telephoto end of the zoom optical system, the first lens group G1 remains fixed; the second lens group G2 moves together with the aperture stop S monotonously toward the object side; the third lens group G3 moves toward the object side in such a way that the space between it and the second lens group G2 becomes first slightly narrow and then wide; and the fourth lens group G4 remains fixed.

The first lens group G1 is composed of a double-concave negative lens and a positive meniscus lens concave on its image side, and has negative power. Both surfaces of the double-concave negative lens and the image-side surface of the positive meniscus lens are aspheric surfaces.

The second lens group G2 is composed of a double-convex positive lens and has positive power. Both surfaces of the double-convex positive lens are aspheric surfaces.

The third lens group G3 is composed of a double-concave negative lens and has negative power. The image-side surface of the double-concave negative lens is an aspheric surface.

The fourth lens group G4 is composed of a positive meniscus lens concave on its object side and has positive power. The image-side surface of this positive meniscus lens is an aspheric surface.

The lenses used here are all fabricated of a resinous material except the double-concave negative lens in the first lens group G1 and the double-convex positive lens in the second lens group G2, which are fabricated of a glass material.

EXAMPLE 5

Figure 5A:
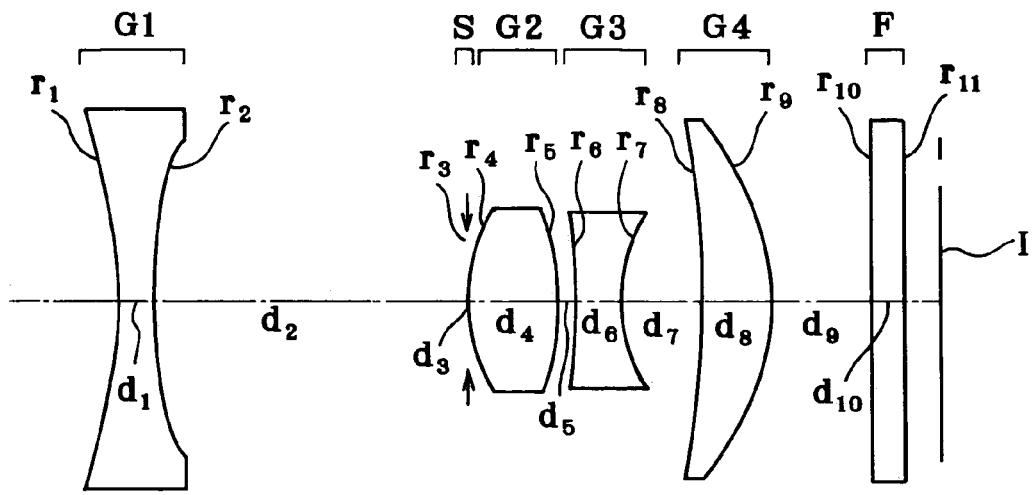
FIG. 5 is a collection of lens arrangement sections illustrative of Example 5 of the inventive zoom optical system, as in FIG. 1.
Figure 5B:
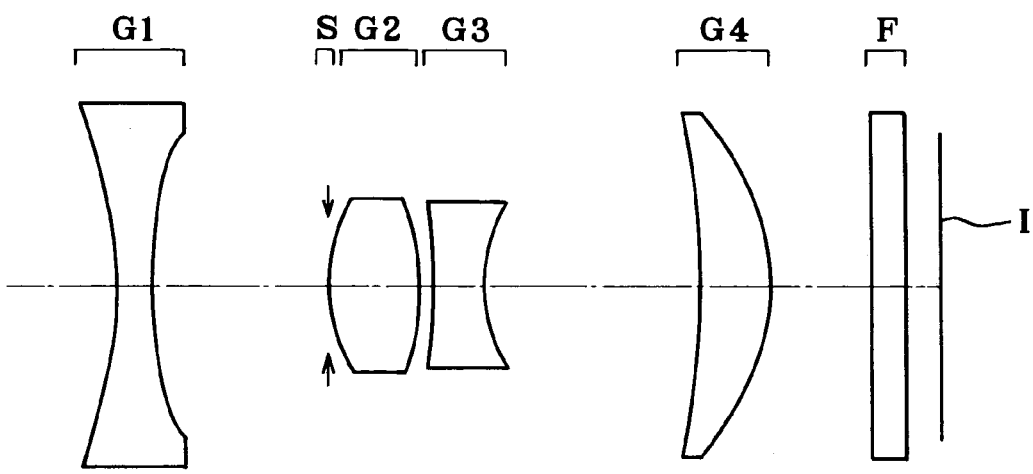
Figure 5C:
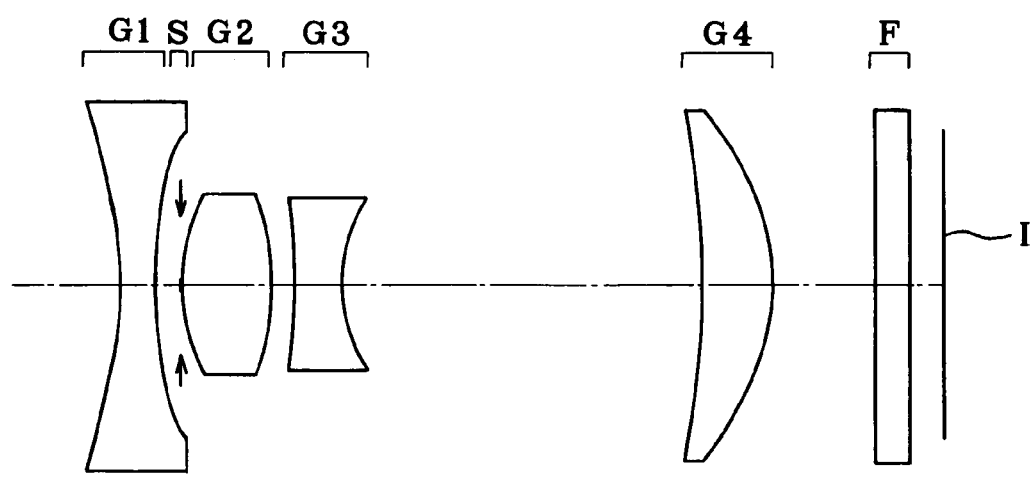

As shown in FIG. 5, Example 5 is directed to a zoom optical system made up of, in order from its object side, a first lens group G1, an aperture stop S, a second lens group G2, a third lens group G3 and a fourth lens group G4. Upon zooming from the wide-angle end to the telephoto end of the zoom optical system, the first lens group G1 remains fixed; the second lens group G2 moves together with the aperture stop S monotonously toward the object side; the third lens group G3 moves toward the object side in such a way that the space between it and the second lens group G2 becomes first slightly narrow and then wide; and the fourth lens group G4 remains fixed.

The first lens group G1 is composed of a double-concave negative lens and has negative power. Both surfaces of the double-concave negative lens are aspheric surfaces.

The second lens group G2 is composed of a double-convex positive lens and has positive power. Both surfaces of the double-convex positive lens are aspheric surfaces.

The third lens group G3 is composed of a double-concave negative lens and has negative power. The image-side surface of the double-concave negative lens is an aspheric surface.

The fourth lens group G4 is composed of a positive meniscus lens concave on its object side and has positive power. The image-side surface of this positive meniscus lens is an aspheric surface.

The lenses used here are all fabricated of a resinous material except the double-convex positive lens in the second lens group G2 and the double-concave negative lens in the third lens group G3, which are fabricated of a glass material.

EXAMPLE 6

Figure 6A:
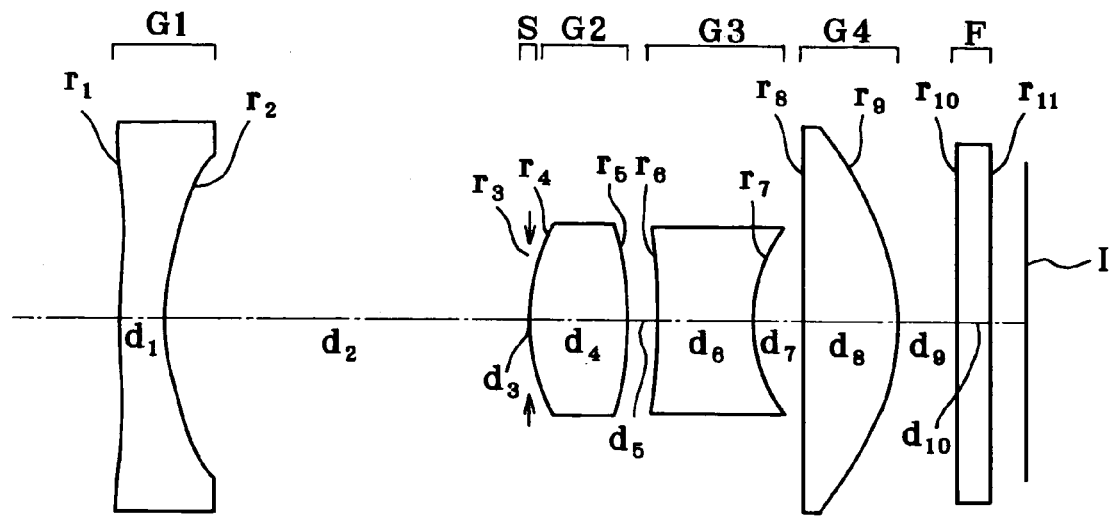
FIG. 6 is a collection of lens arrangement sections illustrative of Example 6 of the inventive zoom optical system, as in FIG. 1.
Figure 6B:
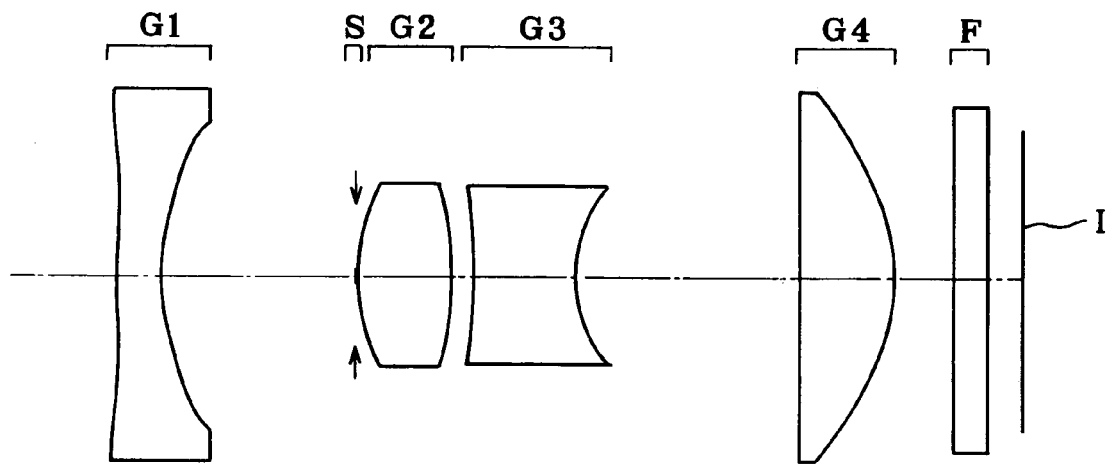
Figure 6C:
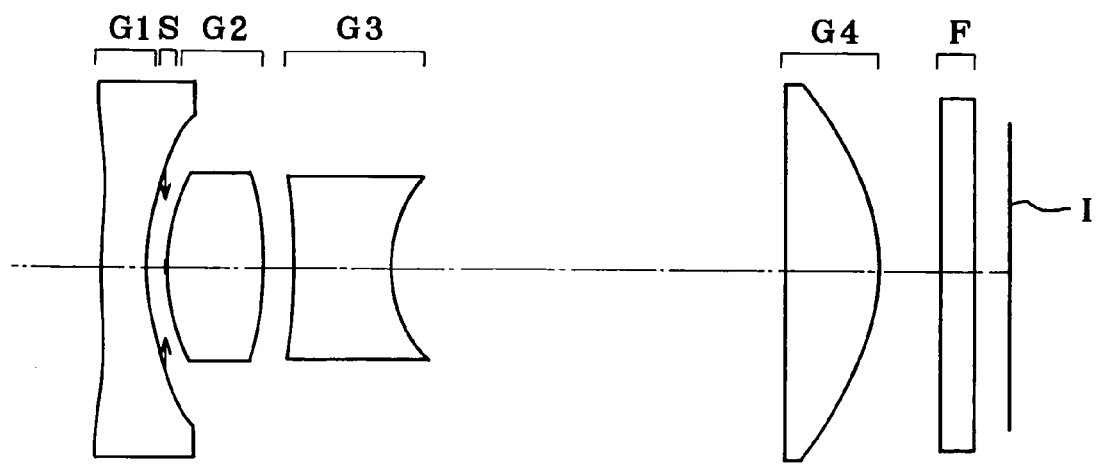

As shown in FIG. 6, Example 6 is directed to a zoom optical system made up of, in order from its object side, a first lens group G1, an aperture stop S, a second lens group G2, a third lens group G3 and a fourth lens group G4. Upon zooming from the wide-angle end to the telephoto end of the zoom optical system, the first lens group G1 remains fixed; the second lens group G2 moves together with the aperture stop S monotonously toward the object side; the third lens group G3 moves toward the object side in such a way that the space between it and the second lens group G2 becomes first slightly narrow and then wide; and the fourth lens group G4 remains fixed.

The first lens group G1 is composed of a negative meniscus lens concave on its image side and has negative power. Both surfaces of the negative meniscus lens are aspheric surfaces.

The second lens group G2 is composed of a double-convex positive lens and has positive power. Both surfaces of the double-convex positive lens are aspheric surfaces.

The third lens group G3 is composed of a double-concave negative lens and has negative power. The image-side surface of the double-concave negative lens is an aspheric surface.

The fourth lens group G4 is composed of a positive meniscus lens concave on its object side and has positive power. The image-side surface of this positive meniscus lens is an aspheric surface.

The lenses used here are all fabricated of a glass material except the negative meniscus lens in the first lens group G1 and the double-convex positive lens in the second lens group G2, which are fabricated of a resinous material.

EXAMPLE 7

Figure 7A:
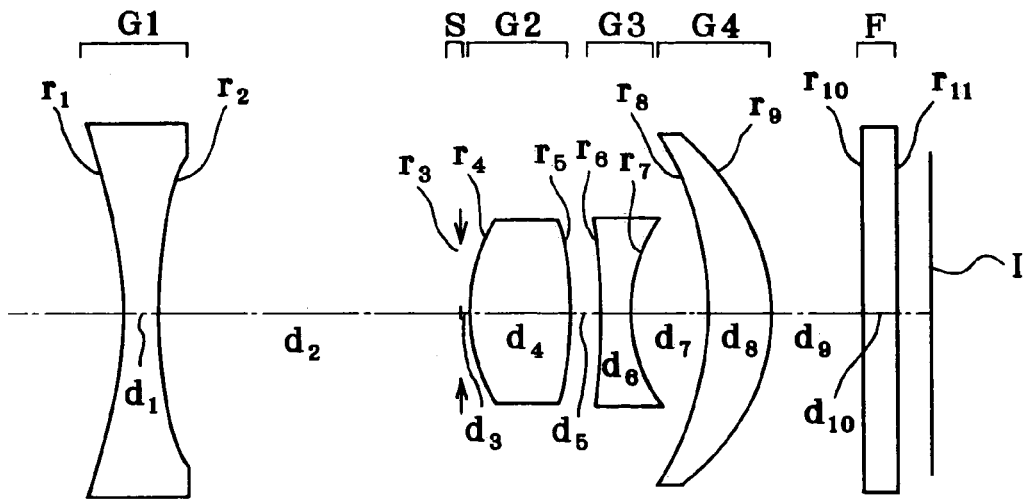
FIG. 7 is a collection of lens arrangement sections illustrative of Example 7 of the inventive zoom optical system, as in FIG. 1.
Figure 7B:
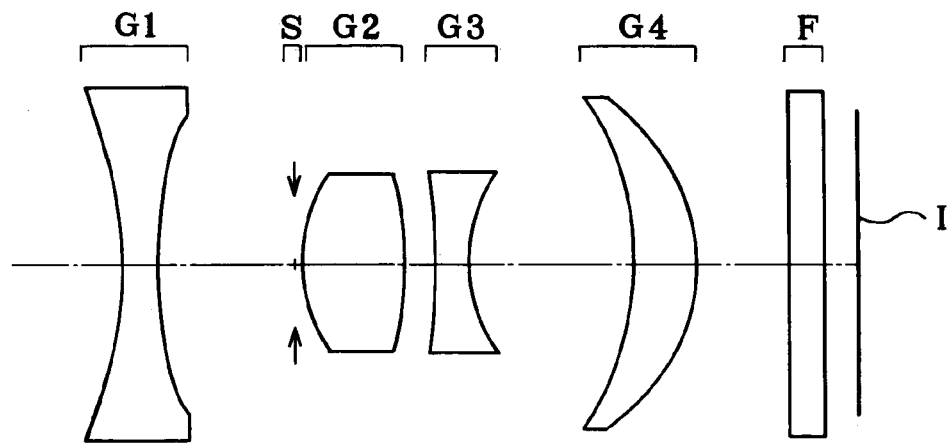
Figure 7C:
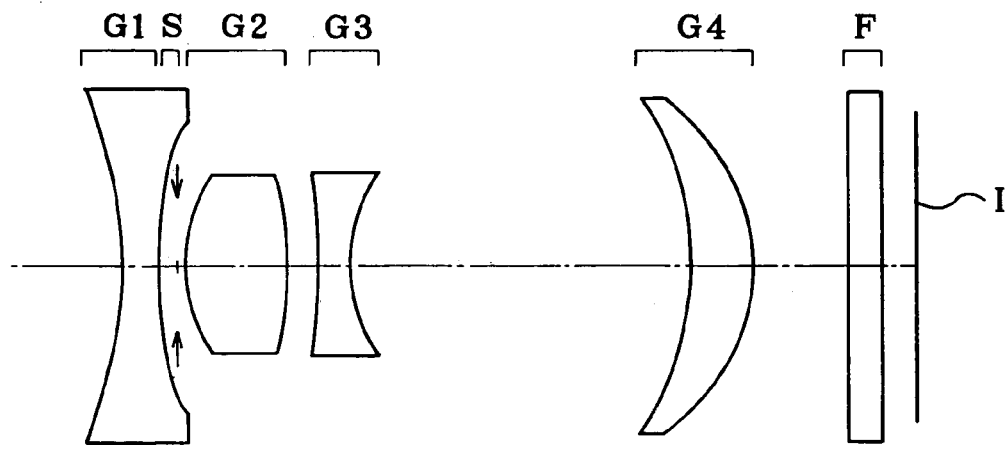
Figure 8A:
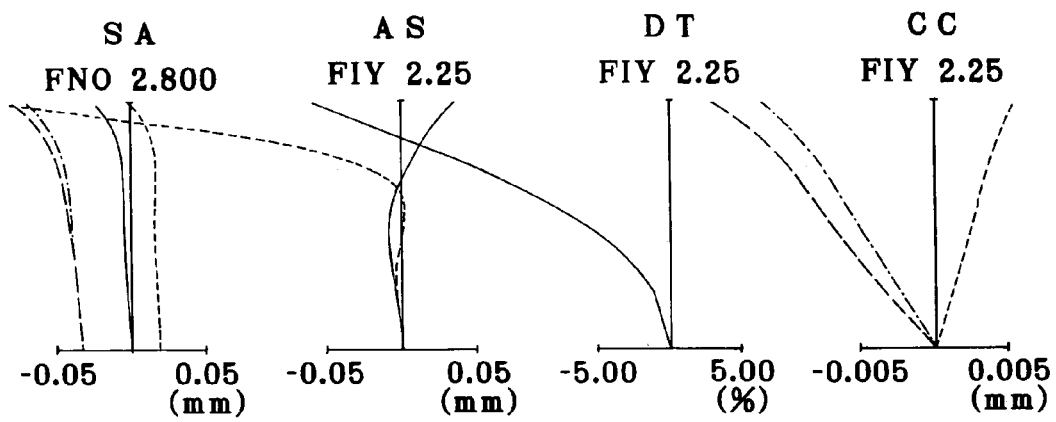
FIG. 8(a) is a diagram at the wide-angle end (a)
Figure 8B:
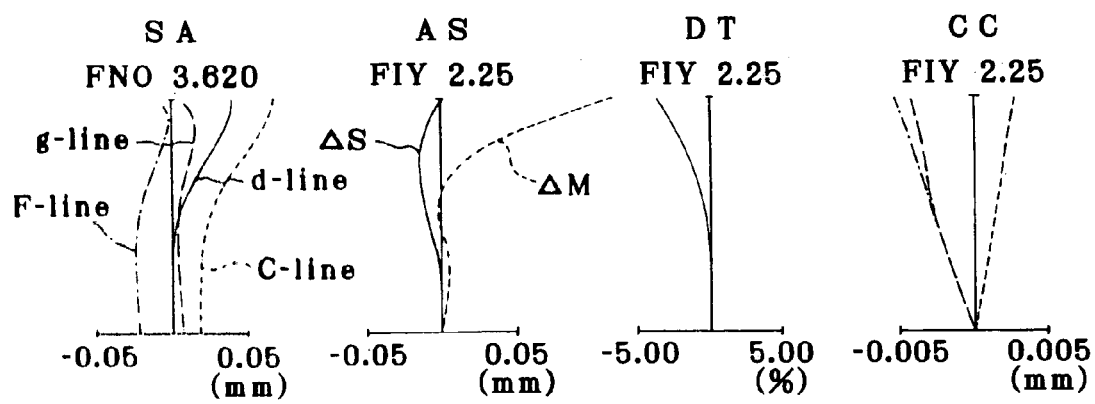
FIG. 8(b) is a diagram in an intermediate setting (b)
Figure 8C:
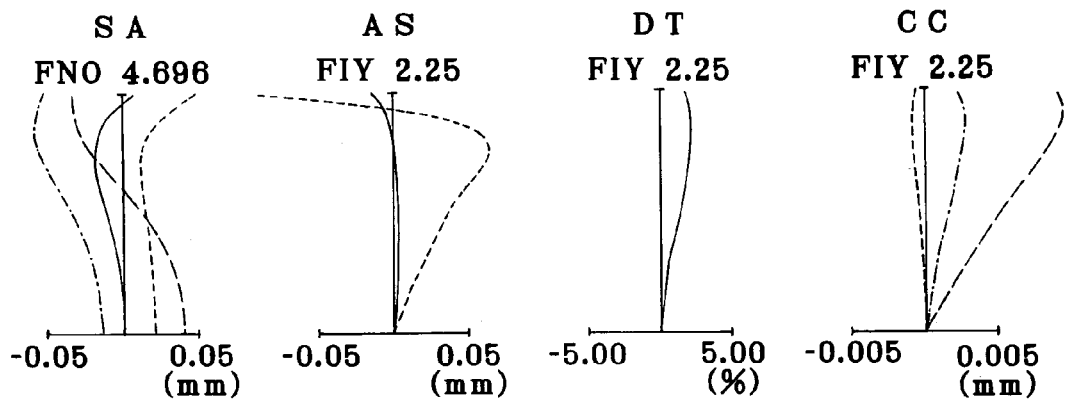
FIG. 8(c) is a diagram at the telephoto end (c).
Figure 9A:
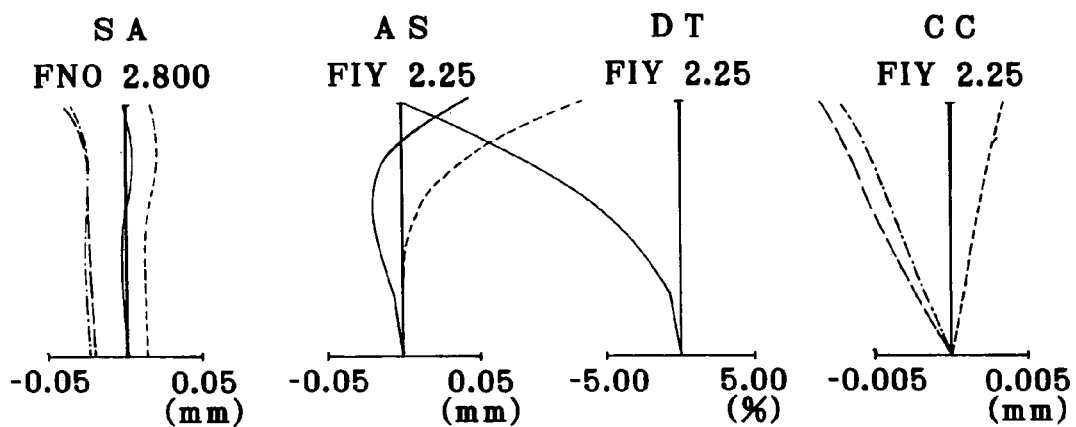
FIG. 9 is a collection of aberration diagrams for Example 2, as in FIG. 8.
Figure 9B:
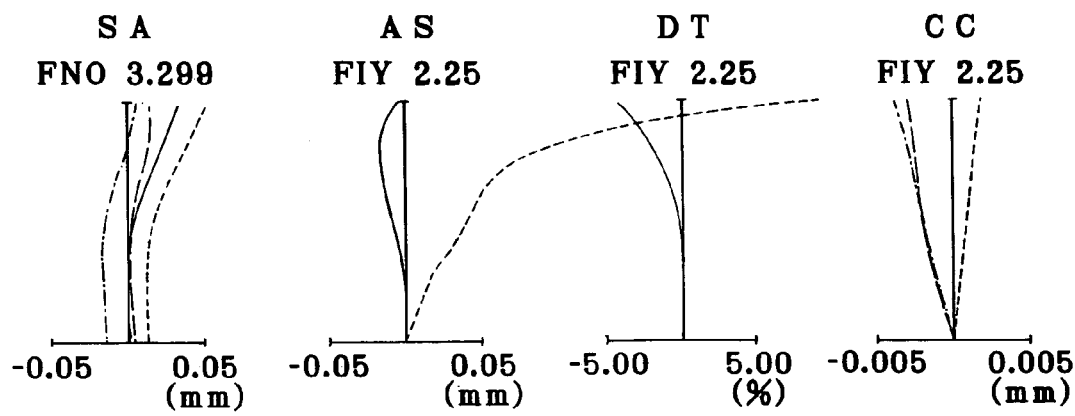
Figure 9C:
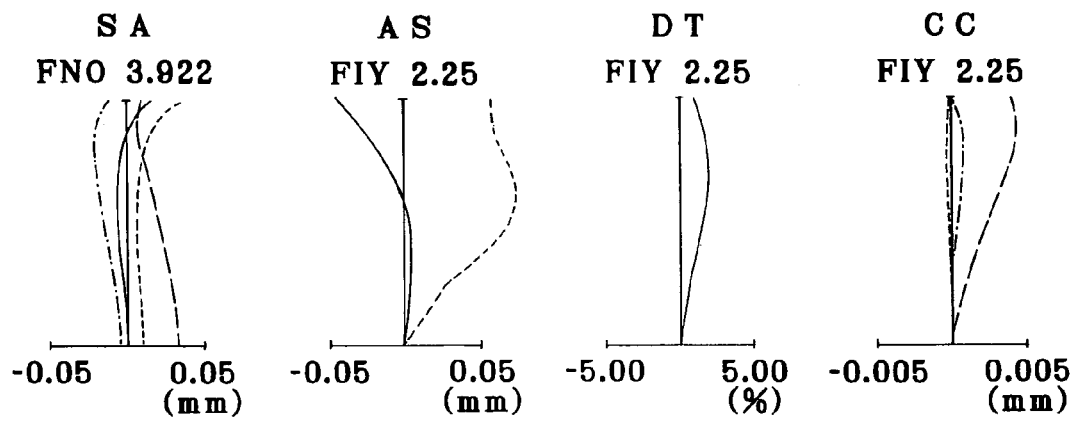
Figure 10A:
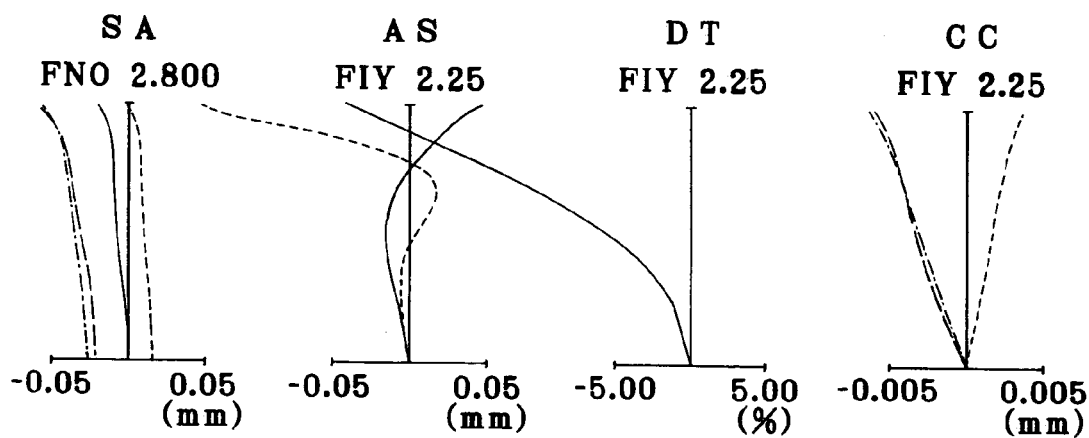
FIG. 10 is a collection of aberration diagrams for Example 3, as in FIG. 8.
Figure 10B:
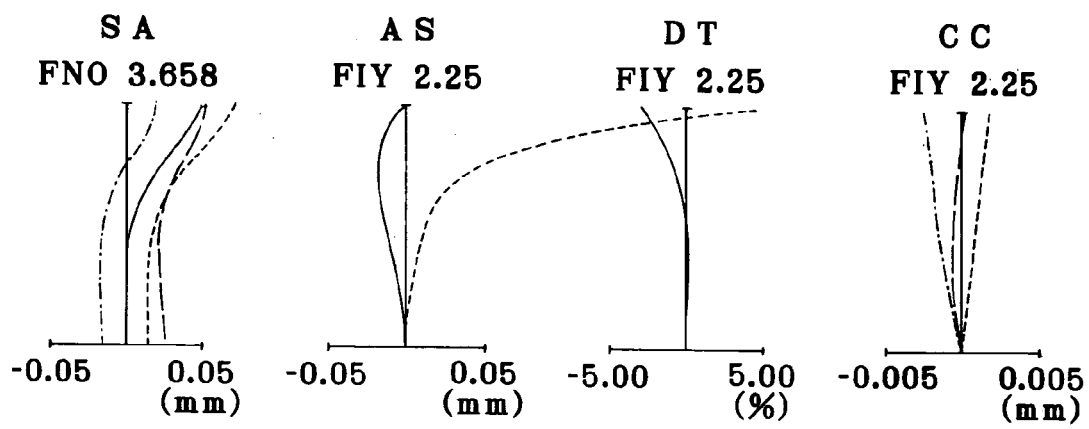
Figure 10C:
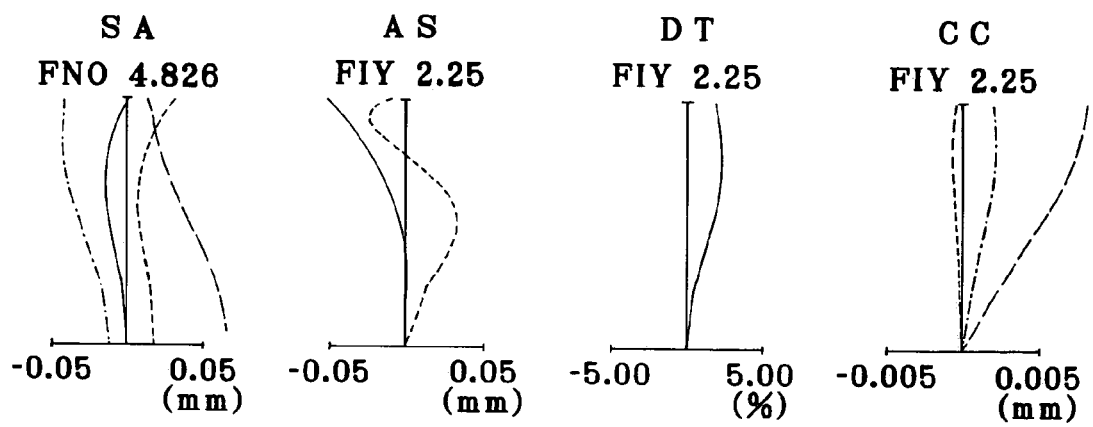
Figure 11A:
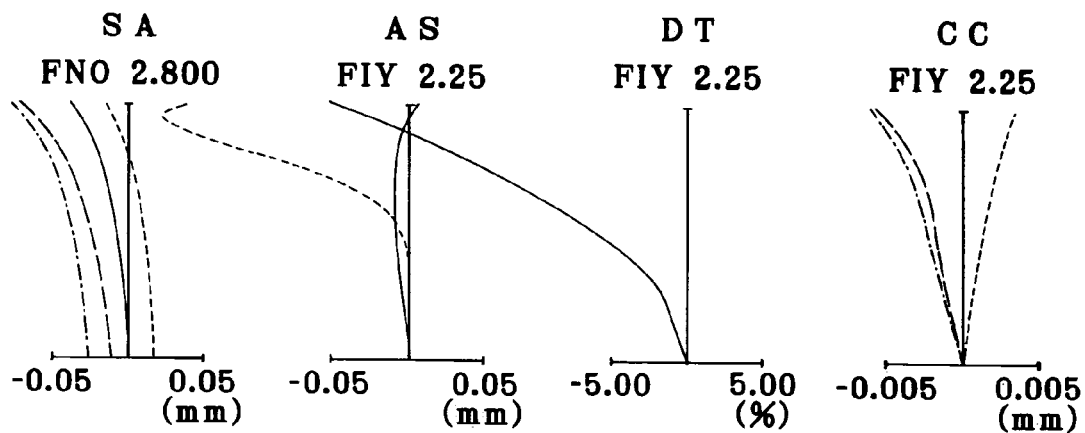
FIG. 11 is a collection of aberration diagrams for Example 4, as in FIG. 8.
Figure 11B:
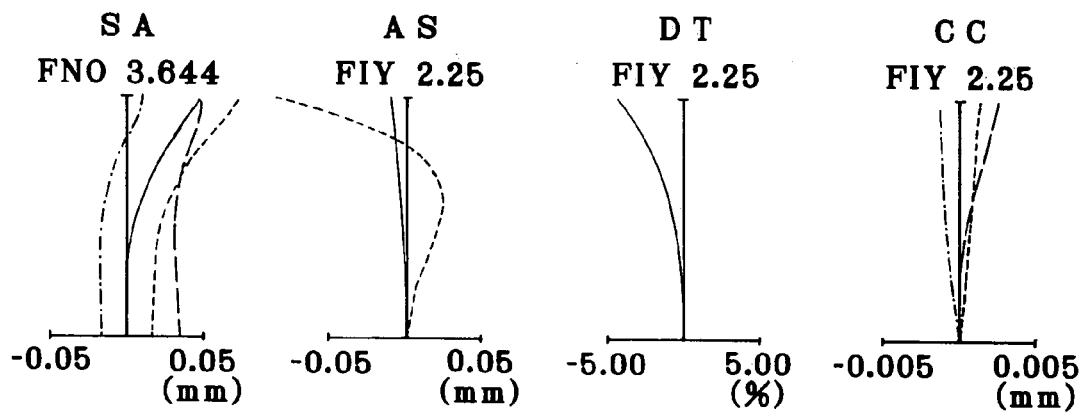
Figure 11C:
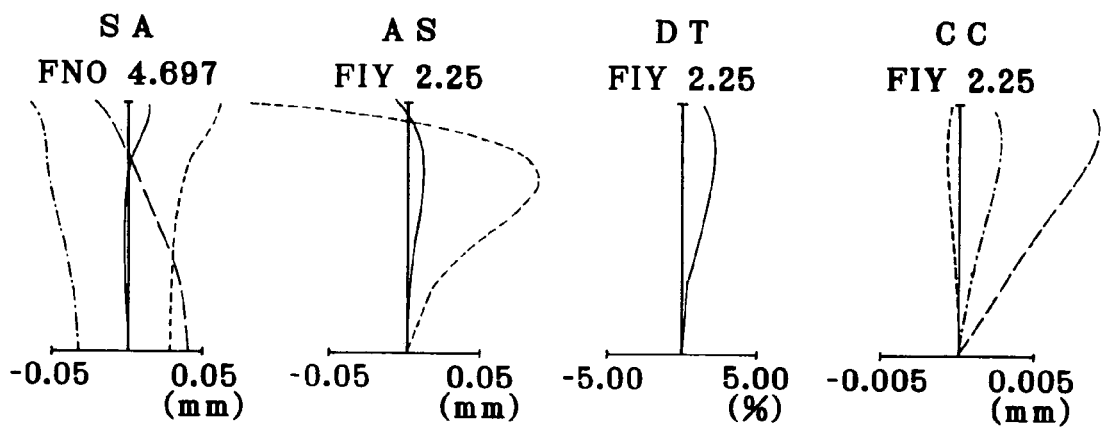
Figure 12A:
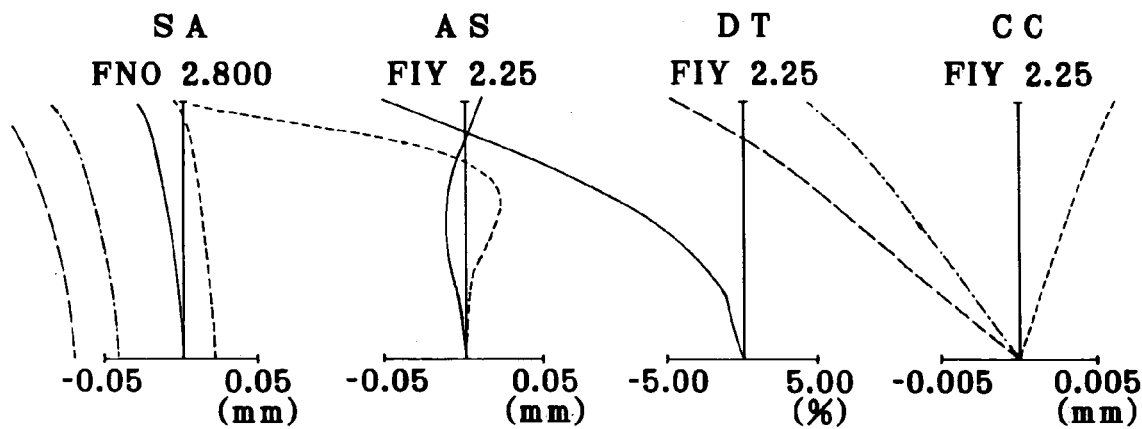
FIG. 12 is a collection of aberration diagrams for Example 5, as in FIG. 8.
Figure 12B:
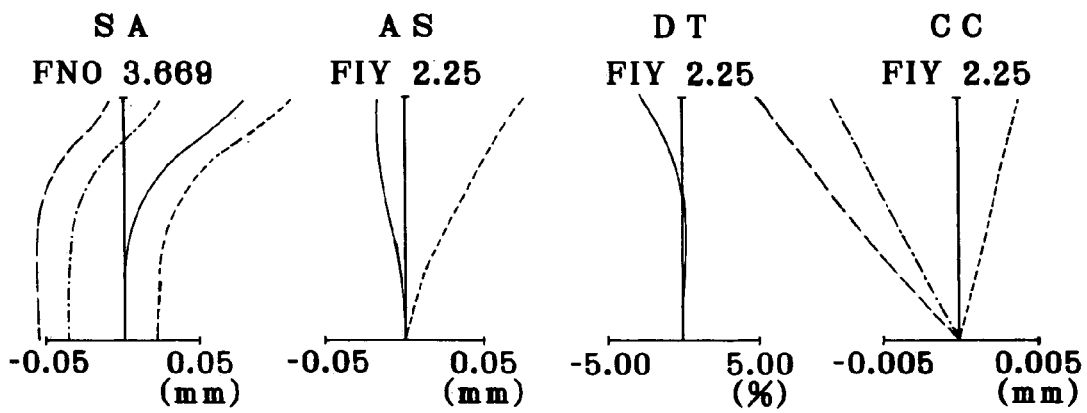
Figure 12C:
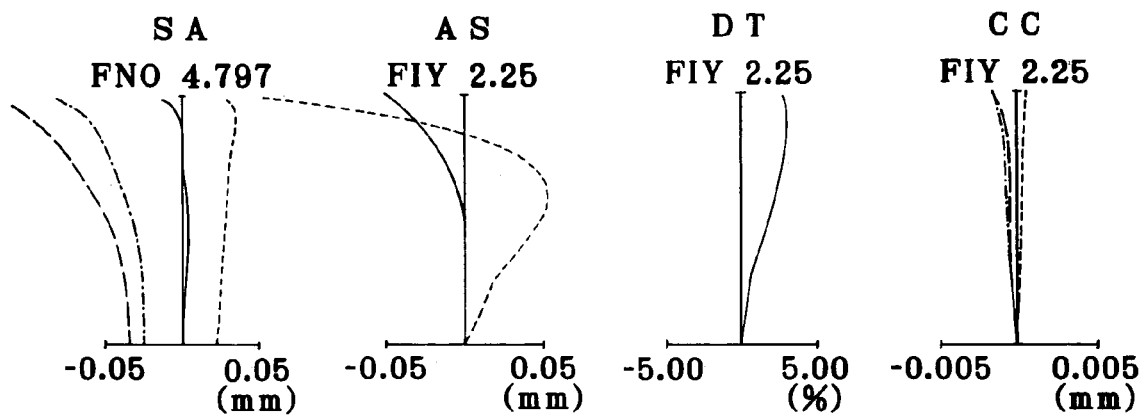

As shown in FIG. 7, Example 7 is directed to a zoom optical system made up of, in order from its object side, a first lens group G1, an aperture stop S, a second lens group G2, a third lens group G3 and a fourth lens group G4. Upon zooming from the wide-angle end to the telephoto end of the zoom optical system, the first lens group G1 moves in a concave locus toward the object side and is positioned nearer to the image side of the zoom optical system at the telephoto end than at the wide-angle end; the second lens group G2 moves together with the aperture stop S monotonously toward the object side; the third lens group G3 moves in unison with the second lens group G2; and the fourth lens group G4 remains fixed.

The first lens group G1 is composed of a double-concave negative lens and has negative power. Both surfaces of the double-concave negative lens are aspheric surfaces.

The second lens group G2 is composed of a double-convex positive lens and has positive power. Both surfaces of the double-convex positive lens are aspheric surfaces.

The third lens group G3 is composed of a double-concave negative lens and has negative power. The image-side surface of the double-concave negative lens is an aspheric surface.

The fourth lens group G4 is composed of a positive meniscus lens concave on its object side and has positive power. The image-side surface of this positive meniscus lens is an aspheric surface.

The lenses used here are all fabricated of a glass material except the double-convex positive lens in the second lens group G2, which is fabricated of a resinous material.

Enumerated below are the numerical data on each example. The symbols used hereinafter but not hereinbefore have the following meanings.

f: focal length calculated as the zoom optical system,
$F_{NO}$: F-number,
ω: half angle of view of a light ray incident on a 60% position of the maximum image height,
WE: wide-angle end,
ST: intermediate setting,
TE: telephoto end,
$r_1, r_2, \ldots$: radius of curvature of each lens surface,
$d_1, d_2, \ldots$: space of adjacent lens surfaces,
$n_{d1}, n_{d2}, \ldots$: d-line refractive index of each lens, and
$v_{d1}, v_{d2}, \ldots$: Abbe constant of each lens. Note here that the "calculated focal length" is the focal length defined in each state as in condition (2). Also note that aspheric surface shape is given by the following formula with the proviso that x is an optical axis with the direction of travel of light being taken as positive and y is a direction orthogonal to the optical axis.

$$x=(y^2/r)/[1+\{1-(K+1)(y/r)^2\}^{1/2}]+A_4y^4+A_6y^6+A_8y^8$$

where r is a paraxial radius of curvature, K is a conical coefficient, and A4, A6 and A8 are the fourth-, the sixth- and the eighth-order aspheric coefficients, respectively.

EXAMPLE 1

| | | | |
|---|---|---|---|
| $r_1$ = −6.183 (Aspheric) | $d_1$ = 0.50 | $n_{d1}$ = 1.52542 | $v_{d1}$ = 55.78 |
| $r_2$ = 5.256 (Aspheric) | $d_2$ = (Variable) | | |
| $r_3$ = ∞ (Stop) | $d_3$ = 0.11 | | |
| $r_4$ = 2.506 (Aspheric) | $d_4$ = 1.40 | $n_{d2}$ = 1.69350 | $v_{d2}$ = 53.21 |
| $r_5$ = −3.911 (Aspheric) | $d_5$ = (Variable) | | |
| $r_6$ = −10.763 | $d_6$ = 0.69 | $n_{d3}$ = 1.60687 | $v_{d3}$ = 27.03 |
| $r_7$ = 2.550 (Aspheric) | $d_7$ = (Variable) | | |
| $r_8$ = −10.931 | $d_8$ = 0.93 | $n_{d4}$ = 1.52542 | $v_{d4}$ = 55.78 |
| $r_9$ = −3.297 (Aspheric) | $d_9$ = 1.47 | | |
| $r_{10}$ = ∞ | $d_{10}$ = 0.50 | $n_{d5}$ = 1.51633 | $v_{d5}$ = 64.14 |
| $r_{11}$ = ∞ | | | |

Aspherical Coefficients

1st surface

K = −8.832
$A_4$ = −1.6811 × 10$^{-2}$
$A_6$ = 4.6095 × 10$^{-3}$
$A_8$ = −3.7318 × 10$^{-4}$

2nd surface

K = 2.683
$A_4$ = −1.7005 × 10$^{-2}$
$A_6$ = 4.8706 × 10$^{-3}$
$A_8$ = −8.7160 × 10$^{-5}$

4th surface

K = −1.446
$A_4$ = 7.1820 × 10$^{-3}$

-continued $A_6 = -1.3597 \times 10^{-3}$
$A_8 = -8.9543 \times 10^{-4}$

5th surface $K = 4.998$
$A_4 = 3.1231 \times 10^{-2}$
$A_6 = -3.7519 \times 10^{-3}$
$A_8 = 3.3416 \times 10^{-3}$ 7th surface $K = 0.398$
$A_4 = -6.3058 \times 10^{-3}$
$A_6 = 1.3348 \times 10^{-2}$
$A_8 = -2.0305 \times 10^{-3}$ 9th surface $K = -5.648$
$A_4 = -1.2285 \times 10^{-2}$
$A_6 = 1.4116 \times 10^{-3}$
$A_8 = -1.5701 \times 10^{-4}$ Zooming Data (∞)

|  | WE | ST | TE |
|---|---|---|---|
| tanω | 0.464 | 0.268 | 0.155 |
| f (mm) | 2.912 | 5.044 | 8.737 |
| $F_{NO}$ | 2.80 | 3.62 | 4.70 |
| $d_2$ | 3.80 | 2.08 | 0.29 |
| $d_5$ | 0.38 | 0.39 | 0.72 |
| $d_7$ | 0.99 | 2.71 | 4.17 |
| $Y_h = 2.25$ mm | | | |

EXAMPLE 2

| | | | |
|---|---|---|---|
| $r_1 = -32.606$ (Aspheric) | $d_1 = 0.50$ | $n_{d1} = 1.52542$ | $\nu_{d1} = 55.78$ |
| $r_2 = 2.845$ (Aspheric) | $d_2$ = (Variable) | | |
| $r_3 = \infty$ (Stop) | $d_3 = -0.16$ | | |
| $r_4 = 1.761$ (Aspheric) | $d_4 = 1.00$ | $n_{d2} = 1.74320$ | $\nu_{d2} = 49.34$ |
| $r_5 = -3.652$ (Aspheric) | $d_5$ = (Variable) | | |
| $r_6 = -8.689$ | $d_6 = 0.50$ | $n_{d3} = 1.60687$ | $\nu_{d3} = 27.03$ |
| $r_7 = 1.972$ (Aspheric) | $d_7$ = (Variable) | | |
| $r_8 = -7.397$ | $d_8 = 0.90$ | $n_{d4} = 1.52542$ | $\nu_{d4} = 55.78$ |
| $r_9 = -2.804$ (Aspheric) | $d_9 = 1.04$ | | |
| $r_{10} = \infty$ | $d_{10} = 0.50$ | $n_{d5} = 1.51633$ | $\nu_{d5} = 64.14$ |
| $r_{11} = \infty$ | | | |

Aspherical Coefficients

1st surface $K = 339.509$
$A_4 = -5.0584 \times 10^{-2}$
$A_6 = 1.5427 \times 10^{-2}$
$A_8 = -1.3268 \times 10^{-3}$ 2nd surface $K = -2.129$
$A_4 = -5.2582 \times 10^{-2}$
$A_6 = 1.7185 \times 10^{-2}$
$A_8 = 1.0183 \times 10^{-3}$ 4th surface $K = -0.740$
$A_4 = 1.7275 \times 10^{-2}$
$A_6 = -3.1227 \times 10^{-3}$
$A_8 = 1.7476 \times 10^{-2}$ 5th surface $K = -0.368$
$A_4 = 6.5061 \times 10^{-2}$
$A_6 = -2.4639 \times 10^{-2}$
$A_8 = 4.5010 \times 10^{-2}$ 7th surface $K = 1.724$
$A_4 = -3.3630 \times 10^{-2}$
$A_6 = 3.5465 \times 10^{-2}$
$A_8 = -2.4462 \times 10^{-2}$ 9th surface $K = 0.404$
$A_4 = 1.3104 \times 10^{-2}$
$A_6 = -2.7380 \times 10^{-3}$
$A_8 = 3.2071 \times 10^{-4}$ Zooming Data (∞)

|  | WE | ST | TE |
|---|---|---|---|
| tanω | 0.464 | 0.328 | 0.232 |
| f (mm) | 2.912 | 4.119 | 5.824 |
| FNO | 2.80 | 3.30 | 3.92 |
| $d_2$ | 2.03 | 1.23 | 0.36 |
| $d_5$ | 0.12 | 0.10 | 0.16 |
| $d_7$ | 0.73 | 1.55 | 2.36 |
| $Y_h = 2.25$ mm | | | |

EXAMPLE 3

| | | | |
|---|---|---|---|
| $r_1 = -9.655$ (Aspheric) | $d_1 = 0.50$ | $n_{d1} = 1.49700$ | $\nu_{d1} = 81.54$ |
| $r_2 = 4.784$ (Aspheric) | $d_2$ = (Variable) | | |
| $r_3 = \infty$ (Stop) | $d_3 = 0.08$ | | |
| $r_4 = 2.585$ (Aspheric) | $d_4 = 1.21$ | $n_{d2} = 1.69350$ | $\nu_{d2} = 53.21$ |
| $r_5 = -3.456$ (Aspheric) | $d_5$ = (Variable) | | |
| $r_6 = -9.610$ | $d_6 = 1.01$ | $n_{d3} = 1.60687$ | $\nu_{d3} = 27.03$ |
| $r_7 = 2.239$ (Aspheric) | $d_7$ = (Variable) | | |
| $r_8 = -20.331$ | $d_8 = 1.08$ | $n_{d4} = 1.52542$ | $\nu_{d4} = 55.78$ |
| $r_9 = -3.315$ (Aspheric) | $d_9 = 1.20$ | | |
| $r_{10} = \infty$ | $d_{10} = 0.50$ | $n_{d5} = 1.51633$ | $\nu_{d5} = 64.14$ |
| $r_{11} = \infty$ | | | |

Aspherical Coefficients

1st surface $K = 0.000$
$A_4 = -1.8649 \times 10^{-2}$
$A_6 = 4.3938 \times 10^{-3}$
$A_8 = -3.0112 \times 10^{-4}$ 2nd surface $K = 0.000$
$A_4 = -2.1364 \times 10^{-2}$
$A_6 = 4.9041 \times 10^{-3}$
$A_8 = -5.0578 \times 10^{-5}$ 4th surface $K = -2.226$
$A_4 = 9.2902 \times 10^{-3}$
$A_6 = -2.4966 \times 10^{-3}$
$A_8 = 0$ 5th surface $K = 0.000$
$A_4 = 1.8077 \times 10^{-2}$
$A_6 = -5.3925 \times 10^{-3}$
$A_8 = 5.3371 \times 10^{-4}$ 7th surface $K = -0.294$
$A_4 = -2.2536 \times 10^{-3}$
$A_6 = 1.2288 \times 10^{-2}$
$A_8 = -1.1899 \times 10^{-3}$ -continued 9th surface K = −0.992
$A_4 = 4.5567 \times 10^{-3}$
$A_6 = -1.1044 \times 10^{-3}$
$A_8 = 5.8436 \times 10^{-5}$ Zooming Data (∞)

|  | WE | ST | TE |
|---|---|---|---|
| tanω | 0.464 | 0.271 | 0.155 |
| f (mm) | 2.912 | 4.982 | 8.737 |
| $F_{NO}$ | 2.80 | 3.66 | 4.83 |
| $d_2$ | 3.98 | 2.25 | 0.22 |
| $d_5$ | 0.28 | 0.22 | 0.39 |
| $d_7$ | 0.77 | 2.57 | 4.43 |

$Y_h$ = 2.25 mm

EXAMPLE 4

| | | |
|---|---|---|
| $r_1$ = −4.079 (Aspheric) | $d_1$ = 0.50 | $n_{d1}$ = 1.49700  $\nu_{d1}$ = 81.54 |
| $r_2$ = 8.948 (Aspheric) | $d_2$ = 0.26 | |
| $r_3$ = 6.961 | $d_3$ = 0.50 | $n_{d2}$ = 1.58423  $\nu_{d2}$ = 30.49 |
| $r_4$ = 8.499 (Aspheric) | $d_4$ = (Variable) | |
| $r_5$ = ∞ (Stop) | $d_5$ = 0.05 | |
| $r_6$ = 2.577 | $d_6$ = 1.33 | $n_{d3}$ = 1.69350  $\nu_{d3}$ = 53.21 |
| $r_7$ = −3.853 (Aspheric) | $d_7$ = (Variable) | |
| $r_8$ = −7.684 | $d_8$ = 0.65 | $n_{d4}$ = 1.60687  $\nu_{d4}$ = 27.03 |
| $r_9$ = 2.484 (Aspheric) | $d_9$ = (Variable) | |
| $r_{10}$ = −77.410 | $d_{10}$ = 1.07 | $n_{d5}$ = 1.52542  $\nu_{d5}$ = 55.78 |
| $r_{11}$ = −3.896 (Aspheric) | $d_{11}$ = 1.51 | |
| $r_{12}$ = ∞ | $d_{12}$ = 0.50 | $n_{d6}$ = 1.51633  $\nu_{d6}$ = 64.14 |
| $r_{13}$ = ∞ | | |

Aspherical Coefficients

1st surface

K = −5.031
$A_4 = 9.1900 \times 10^{-4}$
$A_6 = 2.3688 \times 10^{-4}$
$A_8 = -2.0369 \times 10^{-5}$ 2nd surface K = 0.000
$A_4 = 6.9305 \times 10^{-3}$
$A_6 = -2.9645 \times 10^{-4}$
$A_8 = 0$ 4th surface K = 3.002
$A_4 = -1.0237 \times 10^{-4}$
$A_6 = 5.8425 \times 10^{-4}$
$A_8 = 3.3321 \times 10^{-5}$ 6th surface K = −1.455
$A_4 = 7.1596 \times 10^{-3}$
$A_6 = -7.5701 \times 10^{-4}$
$A_8 = 7.2848 \times 10^{-5}$ 7th surface K = 4.302
$A_4 = 2.9455 \times 10^{-2}$
$A_6 = -4.3530 \times 10^{-3}$
$A_8 = 2.0768 \times 10^{-3}$ 9th surface K = 0.462
$A_4 = -9.8796 \times 10^{-3}$
$A_6 = 1.1006 \times 10^{-2}$
$A_8 = -4.9352 \times 10^{-4}$ -continued 11th surface K = −2.202
$A_4 = 6.4804 \times 10^{-4}$
$A_6 = -2.5619 \times 10^{-4}$
$A_8 = -9.1878 \times 10^{-6}$ Zooming Data (∞)

|  | WE | ST | TE |
|---|---|---|---|
| tanω | 0.464 | 0.268 | 0.155 |
| f (mm) | 2.912 | 5.044 | 8.737 |
| $F_{NO}$ | 2.80 | 3.64 | 4.70 |
| $d_4$ | 4.44 | 2.41 | 0.27 |
| $d_7$ | 0.30 | 0.29 | 0.51 |
| $d_9$ | 1.41 | 3.45 | 5.37 |

$Y_h$ = 2.25 mm

EXAMPLE 5

| | | |
|---|---|---|
| $r_1$ = −8.223 (Aspheric) | $d_1$ = 0.50 | $n_{d1}$ = 1.52542  $\nu_{d1}$ = 55.78 |
| $r_2$ = 6.042 (Aspheric) | $d_2$ = (Variable) | |
| $r_3$ = ∞ (Stop) | $d_3$ = 0.00 | |
| $r_4$ = 2.602 (Aspheric) | $d_4$ = 1.26 | $n_{d2}$ = 1.74320  $\nu_{d2}$ = 49.34 |
| $r_5$ = −3.543 (Aspheric) | $d_5$ = (Variable) | |
| $r_6$ = −8.926 | $d_6$ = 0.69 | $n_{d3}$ = 1.68893  $\nu_{d3}$ = 31.07 |
| $r_7$ = 2.496 (Aspheric) | $d_7$ = (Variable) | |
| $r_8$ = −13.204 | $d_8$ = 0.98 | $n_{d4}$ = 1.52542  $\nu_{d4}$ = 55.78 |
| $r_9$ = −3.213 (Aspheric) | $d_9$ = 1.35 | |
| $d_{10}$ = ∞ | $d_{10}$ = 0.50 | $n_{d5}$ = 1.51633  $\nu_{d5}$ = 64.14 |
| $r_{11}$ = ∞ | | |

Aspherical Coefficients

1st surface

K = −10.658
$A_4 = -1.3563 \times 10^{-2}$
$A_6 = 2.8485 \times 10^{-3}$
$A_8 = -1.7401 \times 10^{-4}$ 2nd surface K = 1.931
$A_4 = -1.3665 \times 10^{-2}$
$A_6 = 2.8113 \times 10^{-3}$
$A_8 = 3.6936 \times 10^{-5}$ 4th surface K = −1.594
$A_4 = 6.3703 \times 10^{-3}$
$A_6 = -1.4234 \times 10^{-3}$
$A_8 = -8.5820 \times 10^{-4}$ 5th surface K = 3.729
$A_4 = 3.1487 \times 10^{-2}$
$A_6 = -6.1491 \times 10^{-3}$
$A_8 = 1.5899 \times 10^{-3}$ 7th surface K = 0.548
$A_4 = -9.0292 \times 10^{-3}$
$A_6 = 1.2875 \times 10^{-2}$
$A_8 = -1.1363 \times 10^{-3}$ 9th surface K = −3.124
$A_4 = -3.0035 \times 10^{-3}$
$A_6 = 1.3365 \times 10^{-4}$
$A_8 = -1.4921 \times 10^{-5}$ -continued

| Zooming Data (∞) | | | |
|---|---|---|---|
| | WE | ST | TE |
| tanω | 0.464 | 0.268 | 0.155 |
| f (mm) | 2.912 | 5.044 | 8.737 |
| $F_{NO}$ | 2.80 | 3.67 | 4.80 |
| $d_2$ | 4.37 | 2.49 | 0.40 |
| $d_5$ | 0.22 | 0.16 | 0.29 |
| $d_7$ | 1.14 | 3.08 | 5.05 |
| $Y_h$ = 2.25 mm | | | |

EXAMPLE 6

| | | | |
|---|---|---|---|
| $r_1$ = 7.747 (Aspheric) | $d_1$ = 0.62 | $n_{d1}$ = 1.49700 | $ν_{d1}$ = 81.54 |
| $r_2$ = 2.692 (Aspheric) | $d_2$ = (Variable) | | |
| $r_3$ = ∞ (Stop) | $d_3$ = 0.00 | | |
| $r_4$ = 2.784 (Aspheric) | $d_4$ = 1.37 | $n_{d2}$ = 1.69350 | $ν_{d2}$ = 53.21 |
| $r_5$ = −4.121 (Aspheric) | $d_5$ = (Variable) | | |
| $r_6$ = −8.694 | $d_6$ = 1.40 | $n_{d3}$ = 1.60687 | $ν_{d3}$ = 27.03 |
| $r_7$ = 2.109 (Aspheric) | $d_7$ = (Variable) | | |
| $r_8$ = −583.06 | $d_8$ = 1.35 | $n_{d4}$ = 1.52542 | $ν_{d4}$ = 55.78 |
| $r_9$ = −3.099 (Aspheric) | $d_9$ = 0.80 | | |
| $r_{10}$ = ∞ | $d_{10}$ = 0.50 | $n_{d5}$ = 1.51633 | $ν_{d5}$ = 64.14 |
| $r_{11}$ = ∞ | | | |

Aspherical Coefficients

1st surface

K = 0.000
$A_4$ = −3.1844 × 10$^{-2}$
$A_6$ = 4.5979 × 10$^{-3}$
$A_8$ = −2.2469 × 10$^{-4}$

2nd surface

K = 0.000
$A_4$ = −4.3997 × 10$^{-2}$
$A_6$ = 6.1072 × 10$^{-3}$
$A_8$ = −3.0480 × 10$^{-4}$

4th surface

K = −1.718
$A_4$ = 6.1590 × 10$^{-3}$
$A_6$ = −3.5451 × 10$^{-5}$
$A_8$ = 0

5th surface

K = 0.000
$A_4$ = 1.4067 × 10$^{-2}$
$A_6$ = −1.3236 × 10$^{-3}$
$A_8$ = −4.0202 × 10$^{-5}$

7th surface

K = −0.880
$A_4$ = 4.0675 × 10$^{-3}$
$A_6$ = 8.2640 × 10$^{-3}$
$A_8$ = 7.3958 × 10$^{-4}$

9th surface

K = −1.385
$A_4$ = 7.2789 × 10$^{-3}$
$A_6$ = −1.6320 × 10$^{-3}$
$A_8$ = 1.0057 × 10$^{-4}$

| Zooming Data (∞) | | | |
|---|---|---|---|
| | WE | ST | TE |
| tanω | 0.386 | 0.209 | 0.120 |
| f (mm) | 3.501 | 6.451 | 11.226 |
| $F_{NO}$ | 2.80 | 4.01 | 5.41 |
| $d_2$ | 5.14 | 2.76 | 0.30 |
| $d_5$ | 0.40 | 0.29 | 0.42 |
| $d_7$ | 0.73 | 3.22 | 5.56 |
| $Y_h$ = 2.25 mm | | | |

EXAMPLE 7

| | | | |
|---|---|---|---|
| $r_1$ = −10.830 (Aspheric) | $d_1$ = 0.50 | $n_{d1}$ = 1.52542 | $ν_{d1}$ = 55.78 |
| $r_2$ = 5.001 (Aspheric) | $d_2$ = (Variable) | | |
| $r_3$ = ∞ (Stop) | $d_3$ = 0.12 | | |
| $r_4$ = 2.379 (Aspheric) | $d_4$ = 1.40 | $n_{d2}$ = 1.69350 | $ν_{d2}$ = 53.21 |
| $r_5$ = −4.330 (Aspheric) | $d_5$ = (Variable) | | |
| $r_6$ = −12.684 | $d_6$ = 0.50 | $n_{d3}$ = 1.60687 | $ν_{d3}$ = 27.03 |
| $r_7$ = 2.616 (Aspheric) | $d_7$ = (Variable) | | |
| $r_8$ = −4.500 | $d_8$ = 0.89 | $n_{d4}$ = 1.52542 | $ν_{d4}$ = 55.78 |
| $r_9$ = −2.437 (Aspheric) | $d_9$ = 0.80 | | |
| $r_{10}$ = ∞ | $d_{10}$ = 0.50 | $n_{d5}$ = 1.51633 | $ν_{d5}$ = 64.14 |
| $r_{11}$ = ∞ | | | |

Aspherical Coefficients

1st surface

K = 1.353
$A_4$ = −1.9133 × 10$^{-2}$
$A_6$ = 3.9701 × 10$^{-3}$
$A_8$ = −2.4010 × 10$^{-4}$

2nd surface

K = −1.448
$A_4$ = −2.0173 × 10$^{-2}$
$A_6$ = 4.1109 × 10$^{-3}$
$A_8$ = 1.4332 × 10$^{-5}$

4th surface

K = −1.242
$A_4$ = 8.6803 × 10$^{-3}$
$A_6$ = −1.8366 × 10$^{-3}$
$A_8$ = 7.1887 × 10$^{-4}$

5th surface

K = 4.369
$A_4$ = 3.0765 × 10$^{-2}$
$A_6$ = −9.1609 × 10$^{-3}$
$A_8$ = 3.5814 × 10$^{-3}$

7th surface

K = 0.376
$A_4$ = −4.4877 × 10$^{-3}$
$A_6$ = 2.1909 × 10$^{-2}$
$A_8$ = −3.8175 × 10$^{-3}$

9th surface

K = −2.625
$A_4$ = −7.2840 × 10$^{-3}$
$A_6$ = −3.3813 × 10$^{-4}$
$A_8$ = −2.7375 × 10$^{-5}$

| Zooming Data (∞) | | | |
|---|---|---|---|
| | WE | ST | TE |
| tanω | 0.464 | 0.268 | 0.155 |
| f (mm) | 2.912 | 5.044 | 8.737 |
| $F_{NO}$ | 2.80 | 3.67 | 4.79 |
| $d_2$ | 4.15 | 1.89 | 0.28 |
| $d_5$ | 0.38 | 0.38 | 0.38 |
| $d_7$ | 1.06 | 2.32 | 4.73 |
| $Y_h$ = 2.25 mm | | | |

Set out below are the values of the parameters in conditions (1) to (15) in each of the above examples.

|  | $dn_2/dT$ | $dn_1/dT$ | $dn_3/dT$ | $HF_{23}/SD_{23}$ | $SF_{G1}$ |
|---|---|---|---|---|---|
| Example 1 | $3.2 \times 10^{-6}$ | $114 \times 10^{-6}$ | $159 \times 10^{-6}$ | −0.43 | 0.08 |
| Example 2 | $6.2 \times 10^{-6}$ | $114 \times 10^{-6}$ | $159 \times 10^{-6}$ | −0.39 | 0.84 |
| Example 3 | $3.2 \times 10^{-6}$ | $-5.9 \times 10^{-6}$ | $159 \times 10^{-6}$ | −0.50 | 0.34 |
| Example 4 | $3.2 \times 10^{-6}$ | $-5.9 \times 10^{-6}$ | $159 \times 10^{-6}$ | −0.55 | −0.35 |
| Example 5 | $6.2 \times 10^{-6}$ | $114 \times 10^{-6}$ | $0.1 \times 10^{-6}$ | −0.50 | 0.15 |
| Example 6 | $3.2 \times 10^{-6}$ | $-5.9 \times 10^{-6}$ | $159 \times 10^{-6}$ | −0.68 | 2.07 |
| Example 7 | $3.2 \times 10^{-6}$ | $114 \times 10^{-6}$ | $159 \times 10^{-6}$ | −0.42 | 0.37 |

|  | $\nu_{d1}$ | $|f_1|/f_w$ | $SF_2$ | $\nu_{d2}$ | $|f_2|/f_w$ |
|---|---|---|---|---|---|
| Example 1 | 55.78 | 1.83 | −0.22 | 53.21 | 0.83 |
| Example 2 | 55.78 | 1.70 | −0.35 | 49.34 | 0.60 |
| Example 3 | 81.54 | 2.19 | −0.14 | 53.21 | 0.80 |
| Example 4 | 81.54 | 1.91 | −0.20 | 53.21 | 0.84 |
| Example 5 | 55.78 | 2.25 | −0.15 | 49.34 | 0.76 |
| Example 6 | 81.54 | 2.47 | −0.19 | 53.21 | 0.74 |
| Example 7 | 55.78 | 2.21 | −0.29 | 53.21 | 0.83 |

|  | $SF_3$ | $\nu_{d3}$ | $SF_4$ | $\nu_{d4}$ | $DT_{min}$ |
|---|---|---|---|---|---|
| Example1 | 0.62 | 27.03 | 1.86 | 55.78 | −25.1 |
| Example2 | 0.63 | 27.03 | 2.22 | 55.78 | −19.4 |
| Example3 | 0.62 | 27.03 | 1.39 | 55.78 | −23.0 |
| Example4 | 0.51 | 23.78 | 1.11 | 55.78 | −24.1 |
| Example5 | 0.56 | 31.07 | 1.64 | 55.78 | −24.7 |
| Example6 | 0.61 | 27.03 | 1.01 | 55.78 | −6.2 |
| Example7 | 0.66 | 27.03 | 3.36 | 55.78 | −24.9 |

Figure 16:
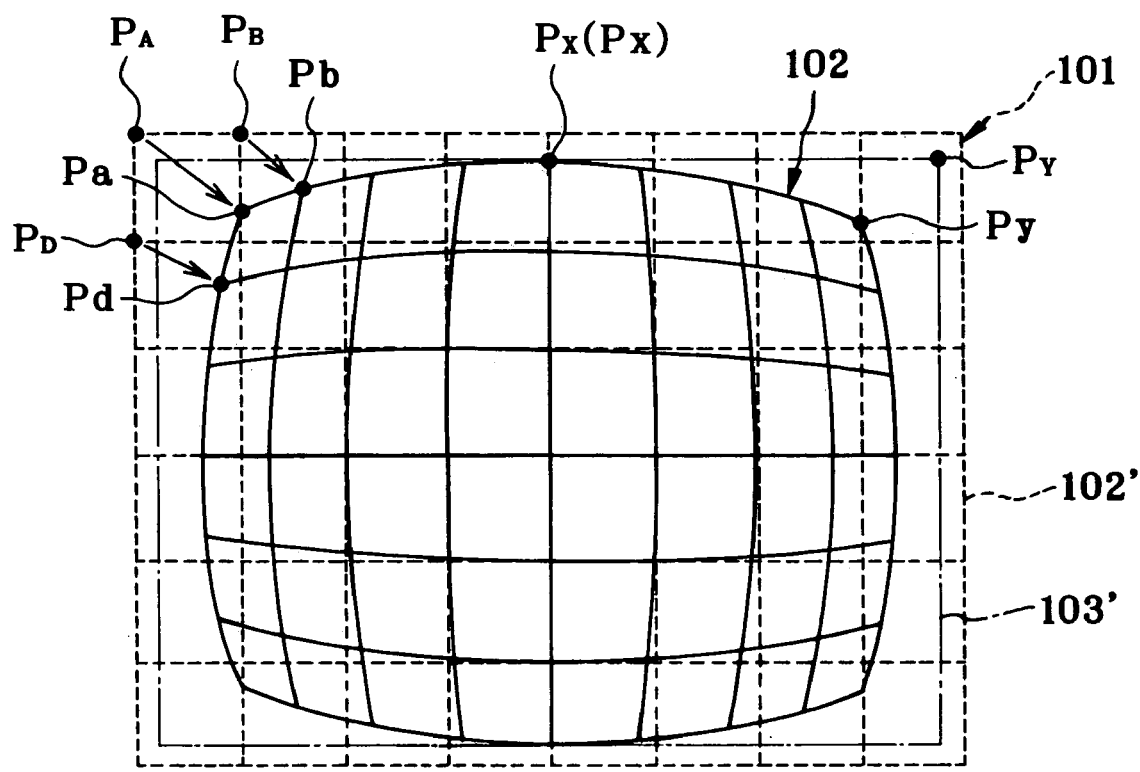
FIG. 16 is an optical distortion diagram indicative of barrel distortion as an example of optical distortion and illustrative of what image should be on the screen.

It should here be noted that all the zoom lenses (zoom optical systems) described in the above examples produce relatively considerable distortions. With subject image information gained via an electronic image pickup device, accordingly, distortion information is also captured in image signal outputs from that electronic image pickup device. In other words, distorted image data are taken in the electronic image pickup device. One exemplary optical distortion is such barrel distortion as shown in FIG. 16. With such barrel distortion, for instance, an image to be by definition formed on a screen position 101 as indicated by broken lines will be formed on a screen position 102 as indicated by solid lines.

Throughout the examples given above, such distortion is electrically corrected. How to electrically correct that distortion is now explained.

To implement correction for optically distorted image signals gained via the electronic image pickup device, the image signals are first converted into digital signals for writing into an image memory. Then, the digital signals are read from the image memory depending on distortion attributes, thereby correcting distortion on the image memory. Referring here to FIG. 16, a lattice form of image will be formed on the screen position 101 shown by broken lines in the absence of any distortion. In the presence of distortion, on the other hand, that lattice form of image will be formed on the screen position 102 indicated by solid lines. In the zoom lens of the invention wherein optical distortion is produced throughout the optical system, the image 101 indicated by broken lines will be stored in the image memory in the form of the image 102 indicated by solid lines under the influence of the above optical distortion. To make correction for this distortion, the image data-before-correction must be read from the image memory as follows. Image data-before-correction stored at a point $P_a$ is read at the timing to read a $P_A$ point, image data-before-correction stored at a point $P_b$ at the timing to read a $P_B$ point, and image data-before-correction stored at a point $P_d$ at the timing to read a $P_D$ point. In this way, the image 102 before correction can be read as a distortion-free image to be properly formed at the lattice form of screen 101 indicated by broken lines, so that an image with corrected optical distortion can be displayed in place.

It is understood that the distortion could be corrected at points other than the reference point $P_x$. In this case, a post-correction image 103 will have the outermost contour (outline) as shown by a one-dot chain line. As can be seen from FIG. 16, the point $P_x$ is a point $P_{X'}$ and remains invariable before and after correction. On the other hand, for instance, a point $P_y$ will correspond to a point $P_{Y'}$. As can also be seen from FIG. 16, the one-dot chain line image will be given by an image that is indicated by a dotted line and reduced in size. Therefore, each point on the image indicated by the solid line will be corrected at a position depending on the ratio of a reduced contour 103' and a broken-line contour 102'.

Figure 17:
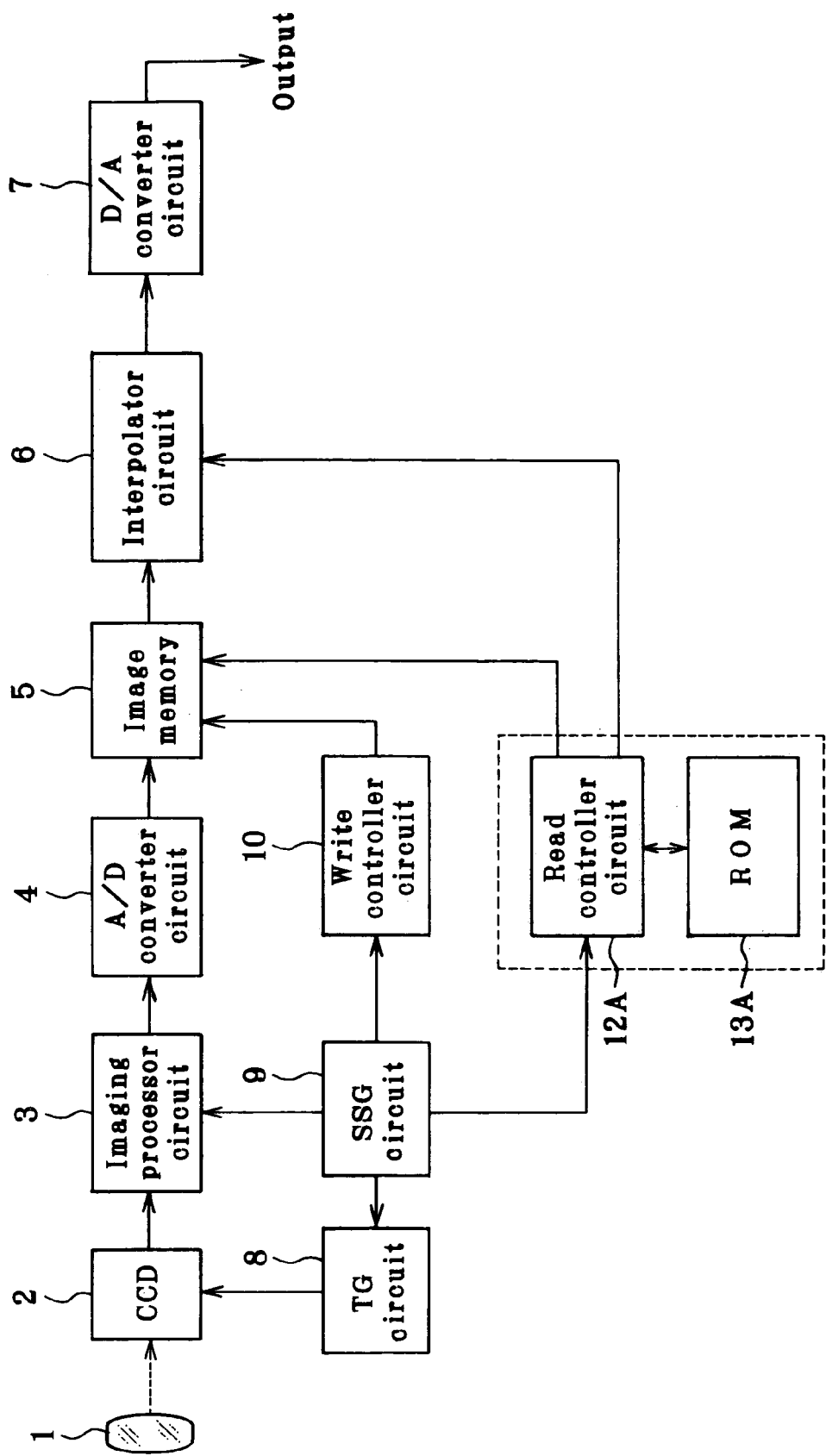
FIG. 17 is a block diagram illustrative of one exemplary image processor for implementing correction of optical distortion.

FIG. 17 is a block diagram illustrative of a unit having an image processing function for correction of optical distortion. Referring to this unit, a subject image is first formed on the image pickup plane of a CCD (electronic image pickup device) 2 via the zoom lens 1 of the invention. Including such optical distortion as described above, the subject image formed on the image pickup plane of CCD 2 is converted into electrical signals at CCD 2. The electrical signals from CCD 2 are converted by given processing at an imaging processor circuit 3 into image signals that are then fed to an A/D converter circuit 4 where they are converted into digital signals for storage in an image memory 5. Writing and reading of signals to and from the image memory 5 are controlled by a write controller circuit 10 and a read controller circuit 12A.

It is noted that an SSG (synchronizing signal generator) circuit 9 is operable to generate a reference timing signal. That SSG (synchronizing signal generator) circuit 9 then feeds the reference timing signal to a TG (timing generator) circuit 8 (as described below), the imaging processor circuit 3, the write controller circuit 10 and the read controller circuit 12A. The TG circuit 8 is operable to send read timing signals in the horizontal (H) and vertical (V) directions to CCD 2. Quantitative correction data predetermined for each section of the screen are preloaded in a quantitative corrector ROM 13A. What is loaded as the predetermined quantitative correction, for instance, is a quantitative correction address value for correction of optical distortion, which is determined depending on the relations of positions on the solid lines to positions on the broken lines, as shown in FIG. 16.

Then, signals (data) are read from the image memory 5 via read signal outputs from the read controller circuit 12A. At this time, the signals are read from the image memory 5 for the purpose of correction of optical distortion. The read signals are interpolated at an interpolator circuit 6, and then converted by a D/A converter 7 into analog signals for outputting.

In this connection, it is noted that an image memory (5) mounted on some digital cameras (electronic cameras) has a tight space. In such a case, it is acceptable to change timing by a time length corresponding to the amount of optical distortion to be corrected before the image signals are stored in the image memory 5, that is, when the image signals are read from CCD 2.

Chromatic aberration of magnification, too, could be electrically corrected if the same distortion correction as mentioned above is implemented for each color separation image. Throughout the examples given above, not just distortion but also chromatic aberration of magnification is electrically corrected at the same time.

The resinous and glass materials are used for the above zoom optical system examples. Instead, however, an organic-inorganic composite material could be used organic-inorganic composite materials usable herein are now explained.

In an organic-inorganic composite material, an organic component and an inorganic component are mixed together into a composite material at a molecular level or a nano-scale. Some available forms include (1) a structure wherein a polymeric matrix comprising an organic skeleton and a matrix comprising an inorganic skeleton are entangled together and penetrated into each other, (2) a structure wherein inorganic fine particles (so-called nano-particles) much smaller than the wavelength of light on a nano-scale are uniformly dispersed throughout a polymeric matrix comprising an organic skeleton, and (3) a combined structure of both. Between the organic component and the inorganic component there are some interactions such as intermolecular forces, e.g., hydrogen bonds, dispersion forces and Coulomb force, attractive forces resulting from covalent bonds, ionic bonds and interaction of $\pi$ electron clouds, etc. In the organic-inorganic composite material, the organic component and the inorganic component are mixed together at a molecular level or at a scale level smaller than the wavelength of light. For this reason, that composite material provides a transparent material because of having little or no influence on light scattering. As can also be derived from Maxwell equation, the composite material possesses the optical characteristics of each of the organic and inorganic components. Therefore, the organic-inorganic composite material can have various optical properties (such as refractive index and chromatic dispersion) depending on the type and quantitative ratio of the organic and inorganic components present. Thus, it is possible to obtain various optical properties by blending together the organic and inorganic components at any desired ratio.

Some exemplary compositions of an organic-inorganic composite material comprising an acrylate resin (of the ultraviolet curable type) and nano-particles of zirconia ($ZrO_2$) are shown in Table 1; some exemplary compositions of an organic-inorganic composite material comprising an acrylate resin and nano-particles of zirconia ($ZrO_2$)/alumina ($Al_2O_3$) in Table 2; some exemplary composition of an organic-inorganic composite material comprising an acrylate resin and nano-particles of niobium oxide ($Nb_2O_5$) in Table 3; and some exemplary compositions of an acrylate resin and nano-particles of zirconium alkoxide/alumina ($Al_2O_3$) in Table 4.

TABLE 1

| Zirconia Content | $n_d$ | $v_d$ | $n_C$ | $n_F$ | $n_g$ |
|---|---|---|---|---|---|
| 0 (100% acrylic) | 1.49236 | 57.85664 | 1.48981 | 1.49832 | 1.50309 |
| 0.1 | 1.579526 | 54.85037 | 1.57579 | 1.586355 | 1.59311 |
| 0.2 | 1.662128 | 53.223 | 5.657315 | 1.669756 | 1.678308 |
| 0.3 | 1.740814 | 52.27971 | 1.735014 | 1.749184 | 1.759385 |
| 0.4 | 1.816094 | 51.71726 | 1.809379 | 1.825159 | 1.836887 |
| 0.5 | 1.888376 | 51.3837 | 1.880807 | 1.898096 | 1.911249 |

TABLE 2

| $Al_2O_3$* | $ZrO_2$* | $n_d$ | $v_d$ | $n_C$ | $n_F$ | $n_g$ | Remarks |
|---|---|---|---|---|---|---|---|
| 0.1 | 0.4 | 1.831515 | 53.56672 | 1.824581 | 1.840374 | 1.8151956 | 50% acrylate |
| 0.2 | 0.3 | 1.772832 | 56.58516 | 1.767125 | 1.780783 | 1.790701 | |
| 0.3 | 0.2 | 1.712138 | 60.97687 | 1.707449 | 1.719127 | 1.727275 | |
| 0.4 | 0.1 | 1.649213 | 67.85669 | 1.645609 | 1.655177 | 1.661429 | |
| 0.2 | 0.2 | 1.695632 | 58.32581 | 1.690903 | 1.702829 | 1.774891 | |

$Al_2O_3$*: quantitative ratio of $Al_2O_3$
$ZrO_2$*: quantitative ratio of $ZrO_2$

TABLE 3

| $Nb_2O_5$* | $Al_2O_3$* | $n_d$ | $v_d$ | $n_C$ | $n_F$ | $n_g$ |
|---|---|---|---|---|---|---|
| 0.1 | 0 | 1.589861 | 29.55772 | 1.584508 | 1.604464 | 1.617565 |
| 0.2 | 0 | 1.681719 | 22.6091 | 1.673857 | 1.70401 | 1.724457 |
| 0.3 | 0 | 1.768813 | 19.52321 | 1.758673 | 1.798053 | 1.8251 |
| 0.4 | 0 | 1.851815 | 17.80818 | 1.839538 | 1.887415 | 1.920475 |
| 0.5 | 0 | 1.931253 | 16.73291 | 1.91708 | 1.972734 | 2.011334 |

$Nb_2O_5$*: content of $Nb_2O_5$
$Al_2O_3$*: content of $Al_2O_3$

TABLE 4

| $Al_2O_3$* | ZA* | $n_d$ | $v_d$ | $n_C$ | $n_F$ |
|---|---|---|---|---|---|
| 0 | 0.2 | 1.533113 | 58.39837 | 1.530205 | 1.539334 |
| 0.1 | 0.27 | 1.54737 | 62.10192 | 1.544525 | 1.553339 |
| 0.2 | 0.24 | 1.561498 | 66.01481 | 1.558713 | 1.567219 |
| 0.3 | 0.21 | 1.575498 | 70.15415 | 1.572774 | 1.580977 |
| 0.4 | 0.18 | 1.589376 | 74.53905 | 1.586709 | 1.594616 |

$Al_2O_3$*: content of $Al_2O_3$ (film)
ZA*: zirconia alkoxide

Electronic equipment incorporating such an inventive zoom or image-formation optical system as described above is now explained. Used for such electronic equipment is a taking unit wherein an object image formed through the above optical system is received by an image pickup device such as CCD for taking purposes. The electronic equipment, for instance, includes digital cameras, video cameras, digital video units, and information processors such as personal computers and mobile computers, telephone sets in general and easy-to-carry cellular phones in particular, personal digital assistants, as embodied below.

Figure 18:
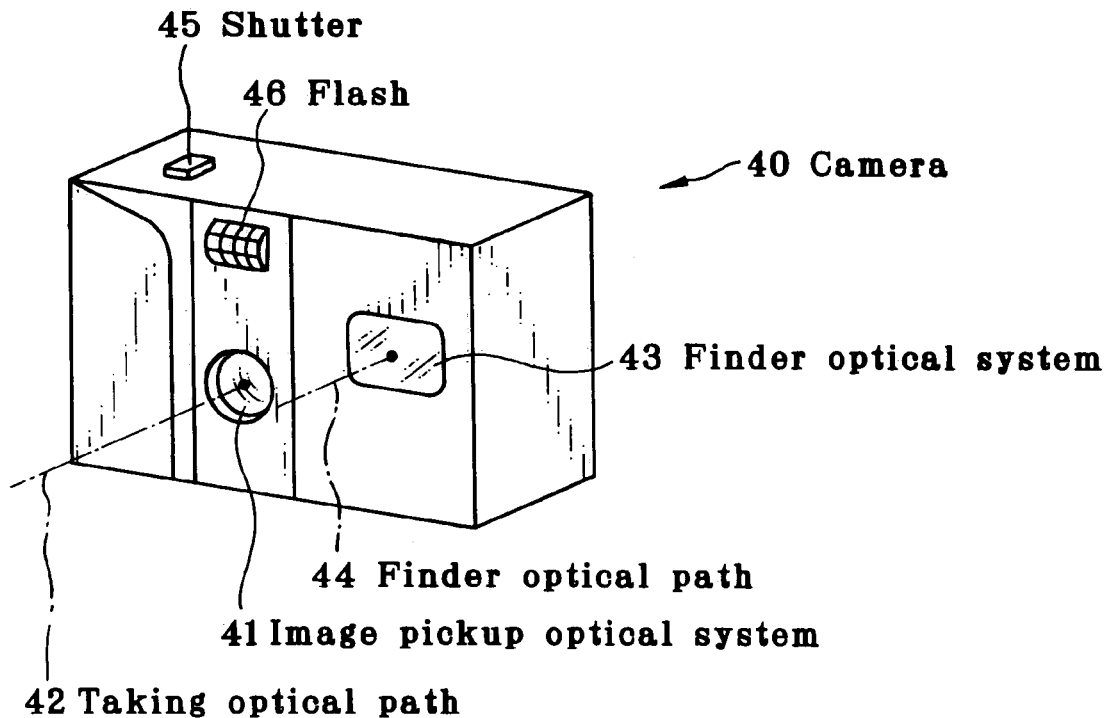
FIG. 18 is a front perspective view of the appearance of a digital camera that incorporates the inventive zoom optical system.
Figure 19:
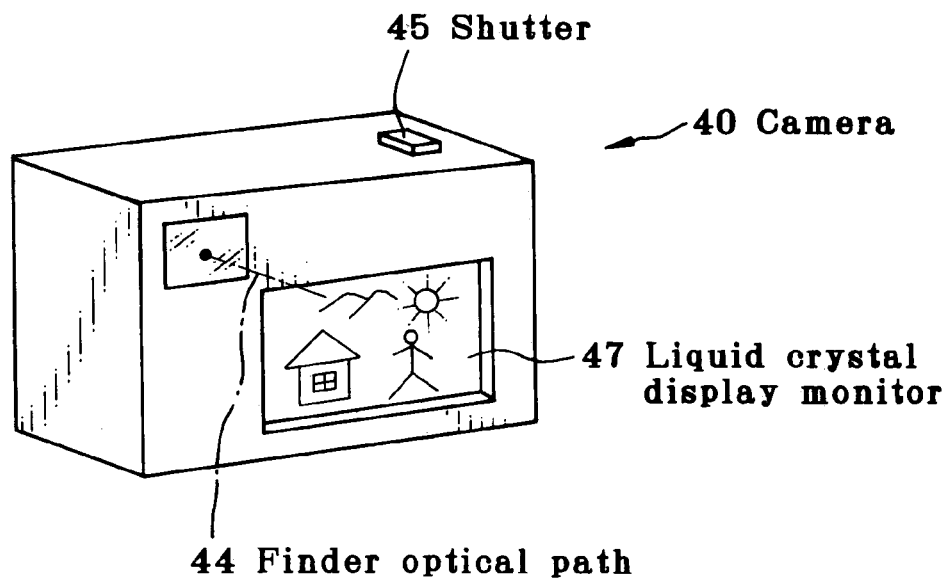
FIG. 19 is a rear perspective view of the FIG. 18 digital camera.
Figure 20:
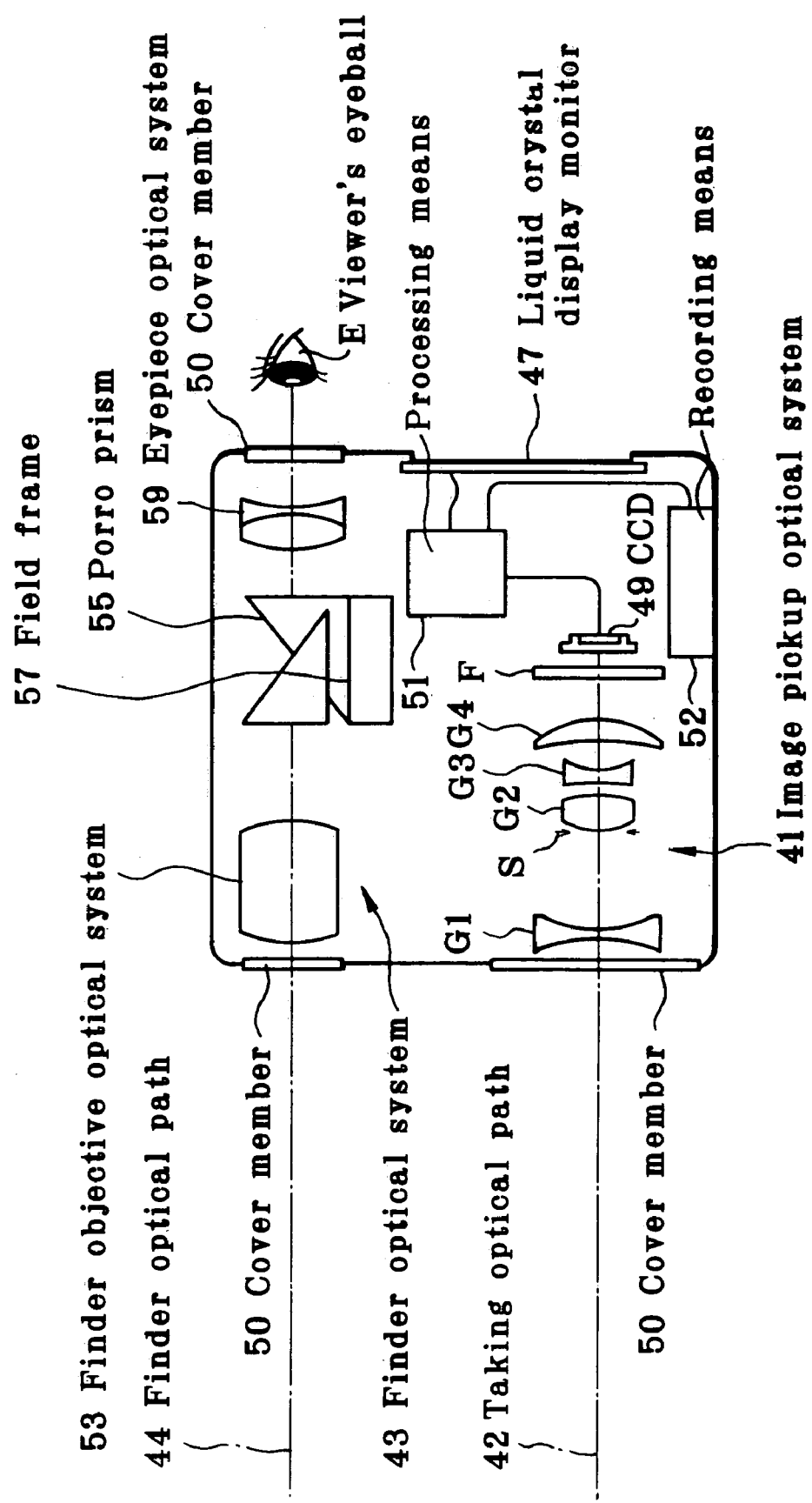
FIG. 20 is a sectional view of the FIG. 18 digital camera.
Figure 21:
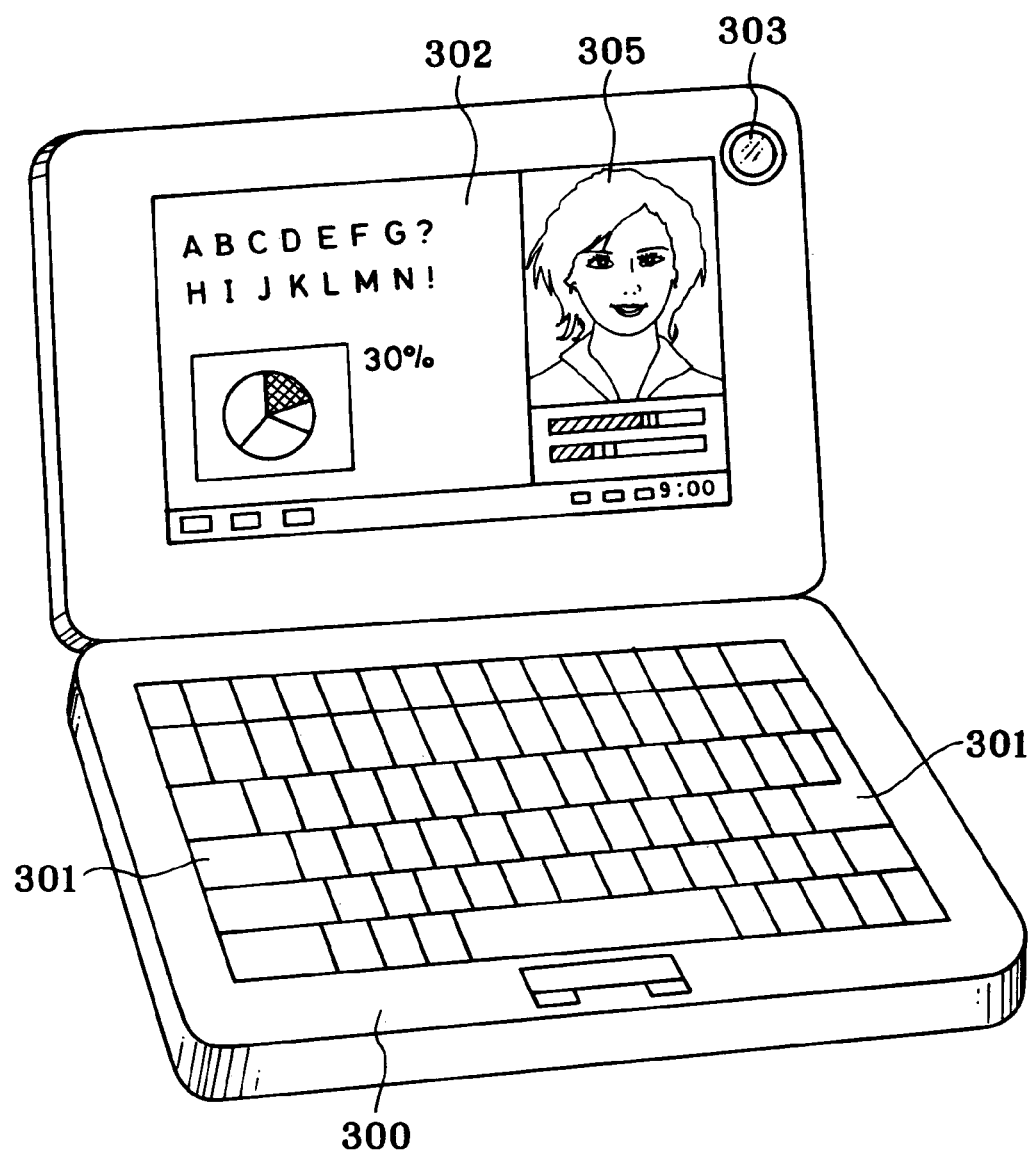
FIG. 21 is a front perspective view depicting a personal computer in which the inventive zoom optical system is incorporated as an objective optical system, while the cover is held open.

FIGS. 18, 19 and 20 are conceptual illustrations of digital camera incorporating the inventive zoom optical system in the form of a taking optical system 41. FIG. 18 is a front perspective view of the outward appearance of a digital camera 40, and FIG. 19 is a rear perspective view of the same. FIG. 21 is a sectional view illustrative of the construction of the digital camera 40.

In this embodiment, the digital camera 40 comprises a taking optical system 41, a finder optical system 43, a shutter 45, a flash 46, a liquid crystal monitor 47 and so on. The taking optical system 41 is located on a taking optical path 42, and the finder optical system 43 is located on a finder optical path 44 separate fro the taking optical path 42. Therefore, as the user presses down the shutter 45, it causes taking to occur through the taking objective optical system 41, for instance, the zoom optical system of Example 1. An object image formed by the taking objective optical system 41 is formed on the image pickup plane of a CCD 49 via a plane-parallel plate P1 and a cover glass P2. The plane-parallel plate P1 here is applied with a near-infrared cut coating. The plane-parallel plate P1 could have a low-pass filter function. The object image received at CCD 49 is shown as an electronic image on the liquid crystal monitor 47 via processing means 51, which monitor is mounted on the back of the camera. This processing means 51 could be connected with recording means 52 to record taken electronic images. Notice that the recording means 52 could be provided separately from the processing means 51. For instance, the recording means 52 could be a floppy disk, a memory card, an MO or the like in such a way that images are electronically recorded or written therein. This camera could also be constructed in the form of a silver-halide camera using a silver-halide film in place of CCD 49.

Moreover, a finder objective optical system 53 is located on the finder optical path 44. An object image formed by that finder objective optical system 53 is formed on a field frame 57, which is attached to a Porro prism 55 that is an image-erecting member. In the rear of the Porro prism 55 there is located an eyepiece optical system 59 for guiding an erected image into the eyeball E of a viewer. Cover members 50 are provided: two on the entrance sides of the taking optical system 41 and the finder objective optical system 53 and one on the exit side of the eyepiece optical system 59. Note here that a powered lens could be used for a plane-parallel plate located as each cover member 50.

The thus assembled camera 40 can be improved in performance and size, because the taking optical system 41 is of high performance and reduced size.

Figure 13A:
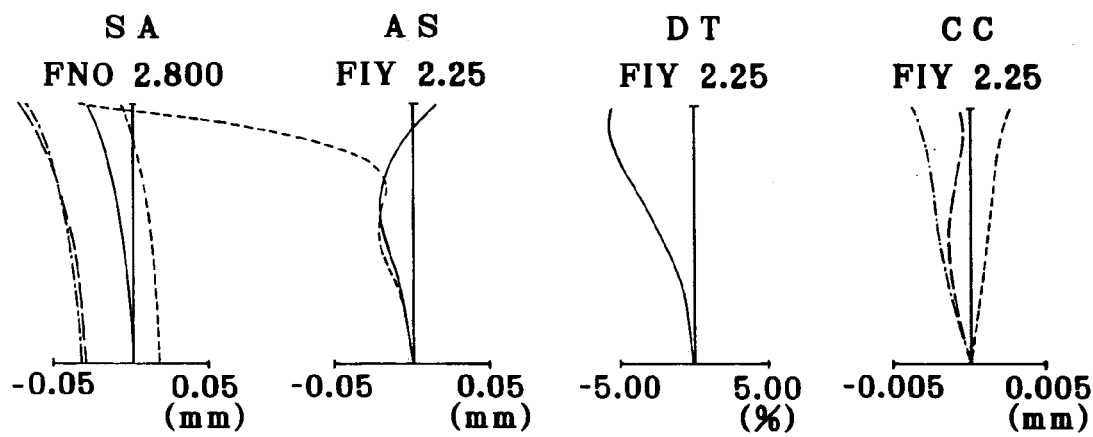
FIG. 13 is a collection of aberration diagrams for Example 6, as in FIG. 8.
Figure 13B:
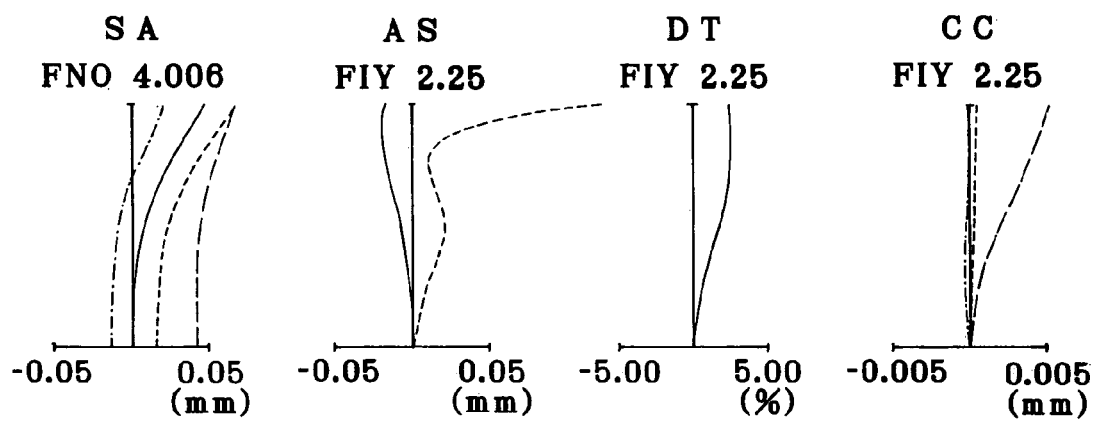
Figure 13C:
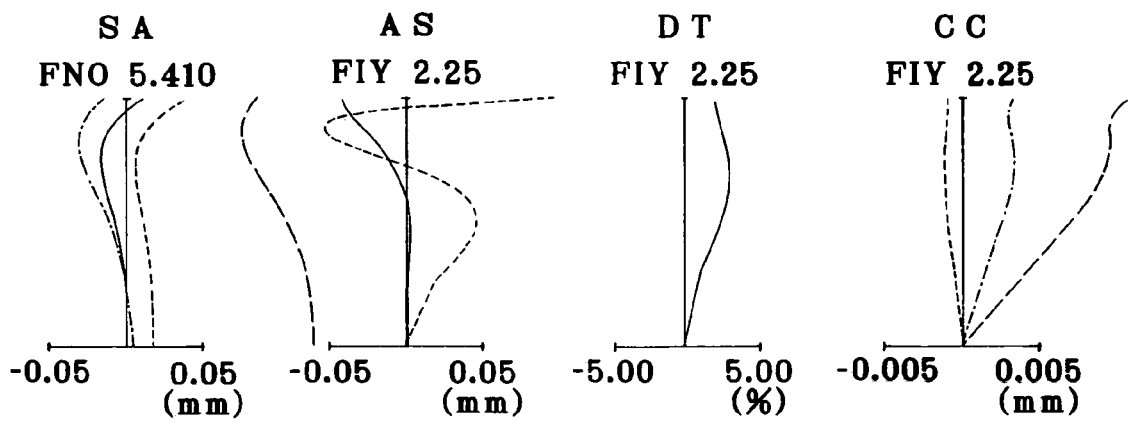
Figure 14A:
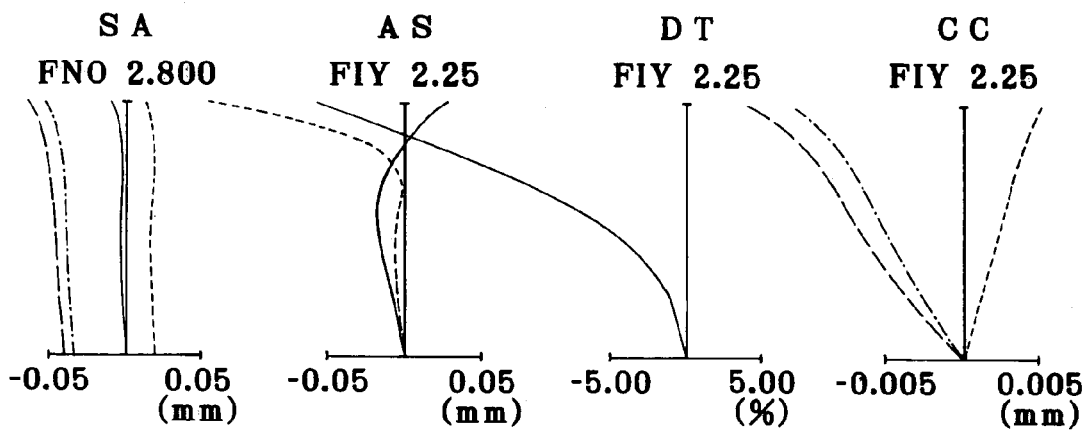
FIG. 14 is a collection of aberration diagrams for Example 7, as in FIG. 8.
Figure 14B:
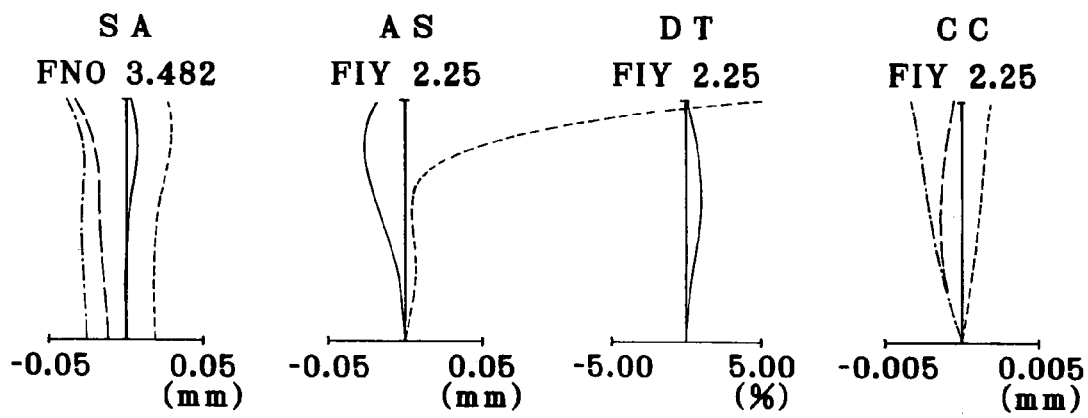
Figure 14C:
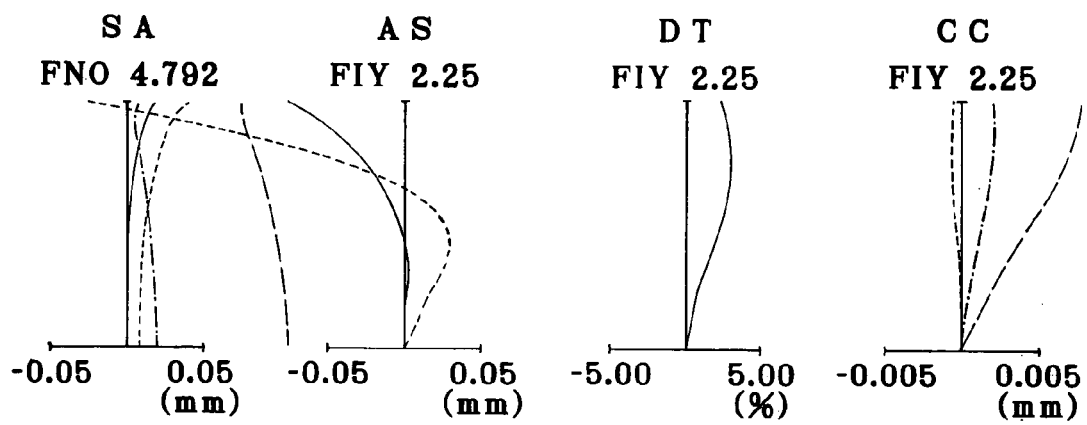
Figure 15A:
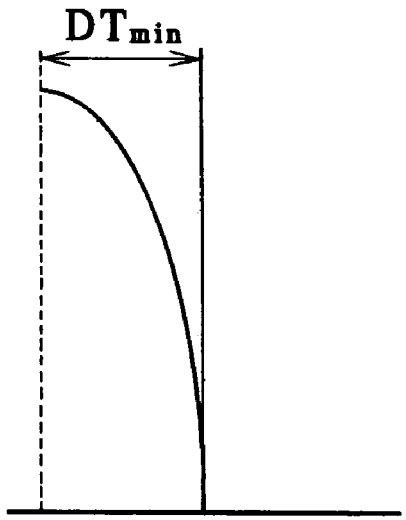
FIG. 15 is a collection of aberration diagrams depicting exemplary amounts of distortion, $DT_{min}$.
Figure 15B:
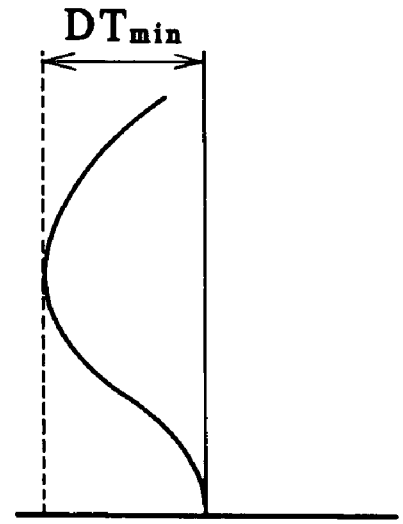
Figure 15C:
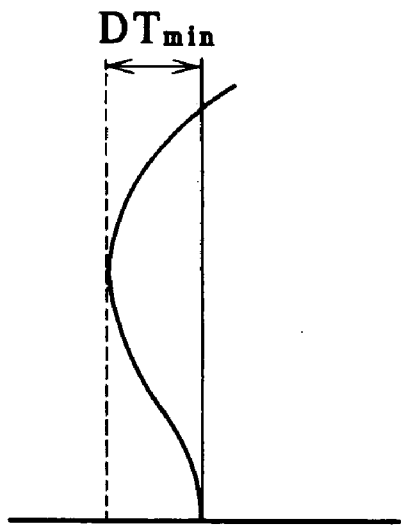
Figure 15D:
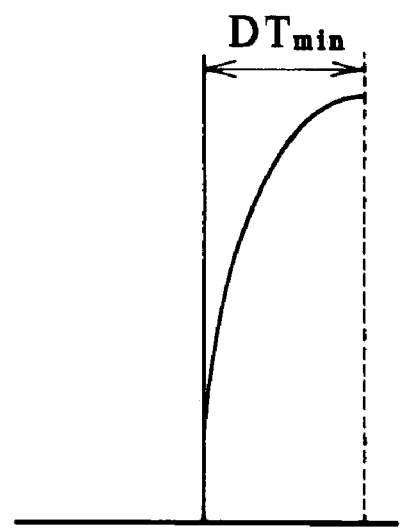
Figure 22:
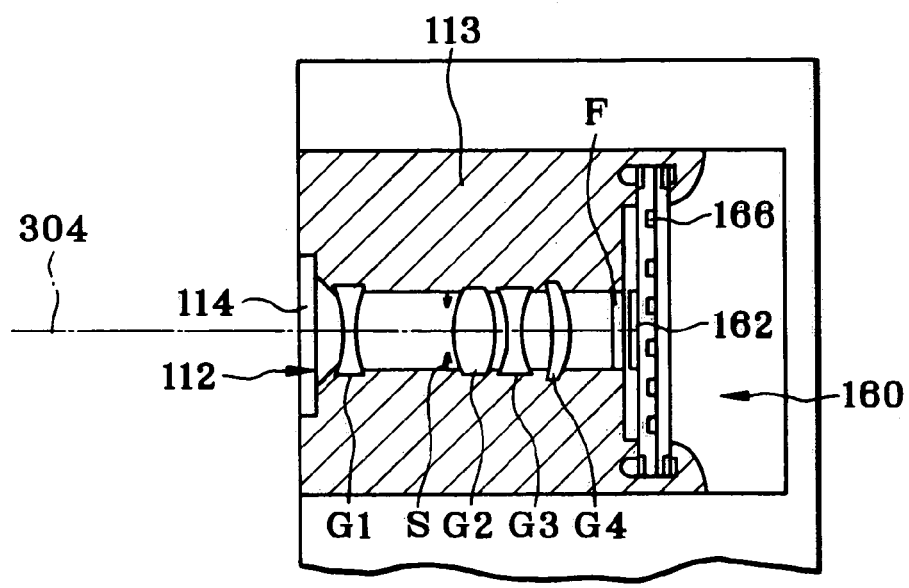
FIG. 22 is a sectional view of a taking optical system in the personal computer.
Figure 23:
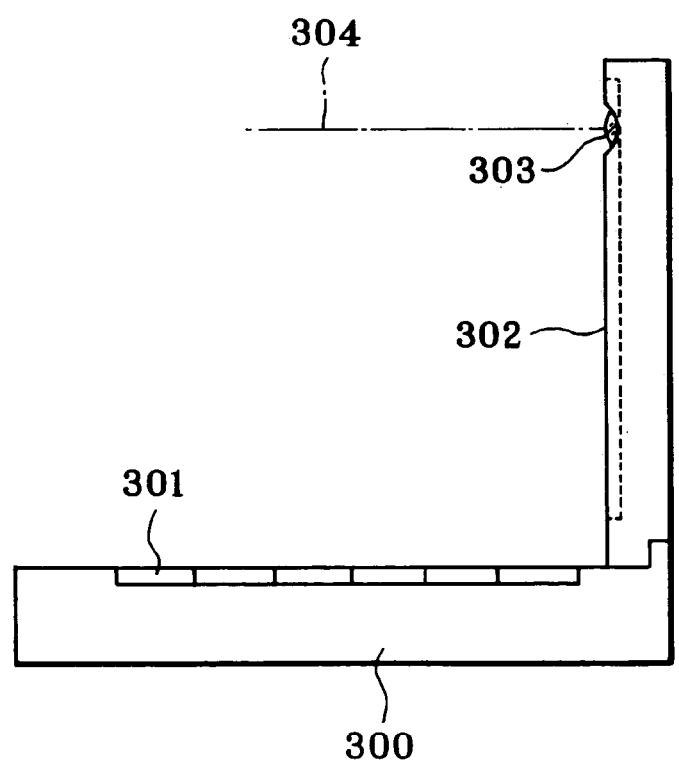
FIG. 23 is a side view of the FIG. 21 state.

FIGS. 21, 22 and 13 are illustrative in conception of a personal computer that is one example of the information processor in which the zoom optical system of the invention is used as an objective optical system. FIG. 21 is a front perspective view of a personal computer 300 in use with a cover put up, FIG. 22 is a side view of a taking optical system 303 in the personal computer 300, and FIG. 23 is a side view of the state of FIG. 21.

The personal computer 300 comprises a keyboard 301 with which the operator enters information in it from outside, a monitor 302 for presenting information to the operator and a taking optical system 303 for taking the operator's image and surrounding images. In addition, the personal computer 300 comprises information processing means and recording means, although not shown. The monitor 302 used here could be any one of a transmission type liquid crystal display device illuminated from its back surface by a backlight (not shown), a reflection type liquid crystal display device designed to display images by reflection of light coming from the front, a CRT display or the like. The taking optical system 303 is provided for taking an image of the operator and surrounding images. While the taking optical system 303 is shown as being built in the right-upper portion of the monitor 302, it is understood that it is not limited thereto; it could be located somewhere around the monitor 302 or keyboard 301.

This taking optical system 303 comprises, on a taking optical path 304, an objective lens 112 comprising the zoom optical system of the invention (roughly shown) and an image pickup device chip 162 for receiving an image. These are built in the personal computer 300.

Here, a plane-parallel plate group F such as an optical low-pass filter is additionally applied onto the image pickup device chip 162. That is, the image pickup device chip 162 and the plane-parallel plate group F are set up as a one-piece image pickup unit 160 that can be fitted into the rear end of the lens barrel 113 of the objective lens 112 in one-touch operation, so that alignment of the objective lens 112 with the image pickup device chip 162 and spacing adjustment between them are dispensed with, leading to easy assembling. At the front end of the lens barrel 113, there is located a cover glass 114 for protection of the objective lens 112. Note here that the driving mechanism for the zoom optical system in the lens barrel 113 is not shown.

An object image received at the image pickup device chip 162 is entered via a terminal 66 in the processing means of the personal computer 300, and shown as an electronic image on the monitor 302. As an example, an image 305 taken of the operator is shown in FIG. 21. This image 305 could be transmitted to and shown on a personal computer on the other end via suitable processing means and the Internet or telephone line.

Figure 24A:
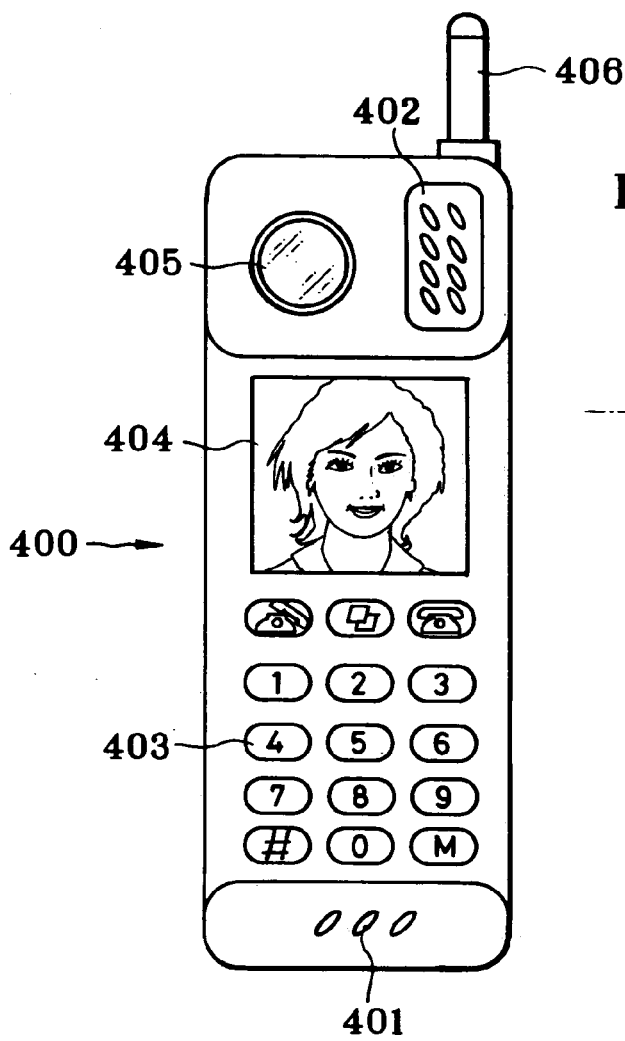
FIGS. 24(a) an 24(b) are a front and a side view of a cellular phone, respectively, in which the inventive zoom optical system is incorporated as an objective optical system.
Figure 24B:
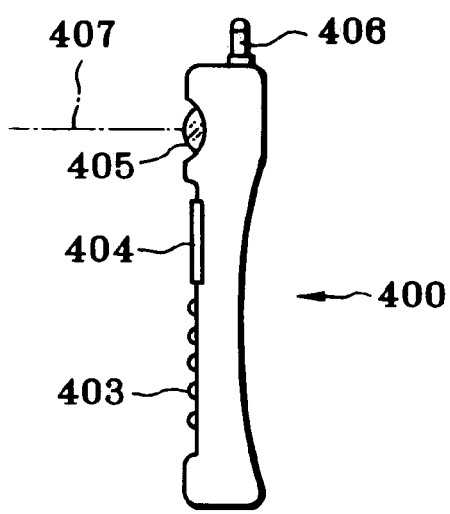
FIG. 24(c) is a sectional view of a taking optical system therein.
Figure 24C:
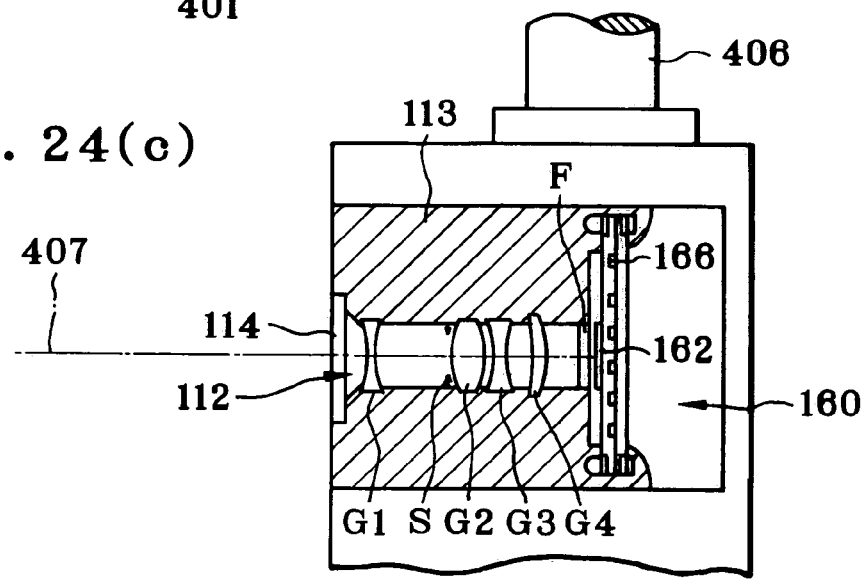

FIGS. 24(*a*), 24(*b*) and 24(*c*) are illustrative in conception of a telephone set that is another example of the information processor in which the zoom optical system of the invention is used as a taking optical system, especially a convenient-to-carry cellular phone. FIG. 24(*a*) and FIG. 24(*b*) are a front view and a side view of a cellular phone 400, respectively, and FIG. 24(*c*) is a sectional view of a taking optical system 405.

The cellular phone 400 comprises a microphone 401, a speaker 402, an input dial 403, a monitor 404, a taking optical system 405, an antenna 406, and processing means (not shown). Here the microphone 401 is to enter the voice of the operator as information in the cellular phone, and the speaker 402 is to produce the voice of the person on the other end. The input dial 403 has a button for the operator to enter information in the cellular phone. The monitor 404 is to show the images taken of the operator per se or the person on the other end and indicate information such as a telephone number. The antenna 406 is to transmit and receive communications waves. A liquid crystal display is used as the monitor 404. Note here that the components or their positions are not limited to those shown. In this embodiment, the taking optical system 405 comprises an objective lens 112 comprising the zoom optical system of the invention (roughly shown) and an image pickup device chip 162 for receiving an object image. These are built in the cellular phone 400.

Here, a plane-parallel plate group F such as an optical low-pass filter is additionally applied onto the image pickup device chip 162. That is, the image pickup device chip 162 and the plane-parallel plate group F are set up as a one-piece image pickup unit 160 that can be fitted into the rear end of the lens barrel 113 of the objective lens 112 in one-touch operation, so that alignment of the objective lens 112 with the image pickup device chip 162 and spacing adjustment between them are dispensed with, leading to easy assembling. At the front end of the lens barrel 113, there is located a cover glass 114 for protection of the objective lens 112. Note here that the driving mechanism for the zoom optical system in the lens barrel 113 is not shown.

An object image received at the image pickup device chip 162 is entered via a terminal 166 in processing means (not shown), so that the object image can be displayed as an electronic image on the monitor 404. The processing means also includes a signal processing function of converting information about the object image received at the image pickup device chip 162 into transmittable signals, thereby sending the image to the person on the other end and allowing it to be shown on a monitor on the other end.

The invention claimed is:

1. A zoom optical system comprising, in order from an object side thereof,
   a first lens group having negative refracting power,
   a second lens group having positive refracting power,
   a third lens group having negative refracting power, and
   a fourth lens group having positive refracting power, wherein:
   said second lens group consists of one positive lens, wherein said positive lens is fabricated of a material that satisfies the following condition:

$$-30\times10^{-6} < dn_2/dT < 50\times10^{-6}$$

where $dn_2/dT$ is a temperature coefficient in $°C.^{-1}$ of a d-line refractive index of the positive lens in said second lens group.

2. The zoom optical system according to claim 1, wherein at least one negative lens included in said first lens group is fabricated of a material that satisfies the following condition:

$$-30\times10^{-6} < dn_1/dT < 50\times10^{-6}$$

where $dn_1/dT$ is a temperature coefficient in $°C.^{-1}$ of a d-line refractive index of the negative lens in said first lens group.

3. A zoom optical system comprising, in order from an object side thereof,
   a first lens group having negative refracting power,
   a second lens group having positive refracting power,
   a third lens group having negative refracting power, and
   a fourth lens group having positive refracting power, wherein:
   said second lens group consists of one positive lens, and
   said second lens group and said third lens group satisfy together the following condition:

$$-100 < HF_{23}/SD_{23} < -0.3$$

where $HF_{23}$ is a composite front principal point position of said second lens group and said third lens group at a wide-angle end (as measured from a vertex of a surface located in said second lens group and nearest to an object side thereof), and $SD_{23}$ is a total sum of thicknesses of lenses included in said second lens group and said third lens group.

4. The zoom optical system according to claim 3, wherein: said first lens group satisfies the following condition:

$$-10 < SF_{G1} < 1$$

where $SF_{G1}$ is a shaping factor of said first lens group that is defined by $$SF_{G1} = (r_{G11}+r_{G12})/(r_{G11}-R_{G12})$$

where $r_{G11}$ is a radius of curvature of a surface located in said first lens group and nearest to an object side thereof, and $r_{G12}$ is a radius of curvature of a surface located in said first lens group and nearest to an image side thereof.

5. A zoom optical system comprising, in order from an object side thereof,
   a first lens group having negative refracting power,
   a second lens group having positive refracting power,
   a third lens group having negative refracting power, and
   a fourth lens group having positive refracting power, wherein:
   said second lens group consists of one positive lens, and
   said first lens group satisfies the following condition:

$$-1 < SF_{G1} < 1$$

where $SFG1$ is a shaping factor of said first lens group that is defined by $$SF_{G1} = (r_{G11}+r_{G12})/(r_{G11}-r_{G12})$$

where $r_{G11}$ is a radius of curvature of a surface located in said first lens group and nearest to an object side thereof, and $r_{G12}$ is a radius of curvature of a surface located in said first lens group and nearest to an image side thereof.

6. The zoom optical system according to claim 5, wherein: at least one negative lens included in said first lens group is fabricated of a material that satisfies the following condition:

$$40 < v_{d1} < 100$$

where $Vd1$ is an Abbe constant of the negative lens in said first lens group.

7. An electronic equipment comprising: the zoom optical system according to claims 1, 3, or 5, an electronic image pickup device located on an image side thereof.

* * * * *